(12) United States Patent
Buermann et al.

(10) Patent No.: US 7,161,664 B2
(45) Date of Patent: Jan. 9, 2007

(54) APPARATUS AND METHOD FOR OPTICAL DETERMINATION OF INTERMEDIATE DISTANCES

(75) Inventors: Dale H. Buermann, Los Altos, CA (US); Michael J. Mandella, San Jose, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 194 days.

(21) Appl. No.: 10/824,330

(22) Filed: Apr. 13, 2004

(65) Prior Publication Data

US 2005/0225742 A1 Oct. 13, 2005

(51) Int. Cl.
*G01C 3/08* (2006.01)
(52) U.S. Cl. ...................... 356/4.01; 356/3.1
(58) Field of Classification Search ............... 356/4.01
See application file for complete search history.

(56) References Cited

U.S. PATENT DOCUMENTS

| | | | |
|---|---|---|---|
| 3,400,398 A * | 9/1968 | Lapeyre et al. ............. 342/398 |
| 4,326,799 A | 4/1982 | Keene et al. |
| 4,911,548 A * | 3/1990 | Keren-Gill ................. 356/3.09 |
| 5,200,793 A | 4/1993 | Ulich et al. |
| 5,477,461 A | 12/1995 | Waffler et al. |
| 5,592,211 A | 1/1997 | Porter et al. |
| 5,638,164 A | 6/1997 | Landau |
| 5,648,852 A | 7/1997 | Kato et al. |
| 5,699,149 A | 12/1997 | Kuroda et al. |
| 5,724,123 A | 3/1998 | Tanaka |
| 5,767,960 A * | 6/1998 | Orman ................... 356/139.03 |
| 5,831,717 A | 11/1998 | Ikebuchi |
| 5,889,582 A | 3/1999 | Wong et al. |
| 5,892,575 A | 4/1999 | Marino |
| 5,959,734 A | 9/1999 | Tanaka et al. |
| 6,034,716 A | 3/2000 | Whiting et al. |
| 6,057,909 A | 5/2000 | Yahav et al. |
| 6,057,910 A | 5/2000 | Dunne |

(Continued)

FOREIGN PATENT DOCUMENTS

WO WO 02/17222 A2 2/2002

OTHER PUBLICATIONS

Borenstein et al., "Where am I?"—Sensors and Methods for Mobile Robot Positioning, Univ. of Michigan for the ORNL D&D Program, Published by Wellesley, MA 1996.

(Continued)

*Primary Examiner*—Thomas H. Tarcza
*Assistant Examiner*—Luke D. Ratcliffe
(74) *Attorney, Agent, or Firm*—Lumen Intellectual Property Services

(57) ABSTRACT

An apparatus and a method are disclosed for optically determining a distance r to a feature from an origin or a center. The apparatus uses a beam generation unit for launching a reference beam on a reference path and a first beam on a first path. The center from which distance r is determined is selected such that it is along a line of the reference path and not along a line of the first path. Alternatively, the center can be chosen not to lie along a line of the reference path. A rotation mechanism rotates the reference path and the first path about the center such that the reference beam moves over the feature at a reference time $t_r$ and the first beam moves over the feature at a first time $t_1$. A determination unit determines distance r between the center and the feature from an angular velocity $\omega$ of the reference beam over the feature and from times $t_r$, $t_1$.

32 Claims, 12 Drawing Sheets

U.S. PATENT DOCUMENTS

| | | | |
|---|---|---|---|
| 6,064,471 | A | 5/2000 | Nakagawa |
| 6,115,111 | A * | 9/2000 | Korah et al. ............... 356/4.01 |
| 6,545,751 | B1 * | 4/2003 | Beliveau et al. ......... 356/141.4 |
| 6,710,859 | B1 | 3/2004 | Shirai et al. |
| 2004/0075650 | A1 | 4/2004 | Lapstun et al. |

OTHER PUBLICATIONS

LCS/Telegraphics Wintab™ :Advanced Pointing Device Management for Windowed Environments, Jul. 8, 2004, 4 pages.

Ota, Jeff. "Quantitative Underwater 3-D Imaging and Mapping" http://www.cdr.stanford.edu/~jota/quals/, Mar. 16, 2000, Updated Jul. 11, 2000, 10 pages.

Park et al., "Dual-Beam Structures-Light Scanning for 3-D Object Modeling", Third Int'l Conference on 3-D Imaging and Modeling, Proceedings May 28, 2001-Jun. 1, 2001, pp. 65-72.

Poyner, LCS/Telegraphics, "Wintab™ Interface Specificaion: 16- and 32 bit API Reference", Revised May 9, 1996.

* cited by examiner

_US 7,161,664 B2_

APPARATUS AND METHOD FOR OPTICAL DETERMINATION OF INTERMEDIATE DISTANCES

FIELD OF THE INVENTION

The present invention relates to an optical apparatus and method for optical ranging. More specifically, it relates to employing beams propagating in certain relationships to each other to determine distances to features, especially when the distances fall in an intermediate range from a few centimeters to a few meters.

BACKGROUND

Determination of distances to stationary or moving objects is an important measurement challenge encountered in many fields of science and technology. In some cases, the distances to the objects of interest are macroscopic and can be expressed in kilometers or larger units. This is true, for example, in determining distances or ranging remote structures or moving objects, such as vehicles. In other cases, the distances to the objects of interest are microscopic and can be expressed in millimeters or smaller units. Such conditions are encountered, for example, when determining distances between micro-structures on a silicon wafer. The prior art teaches a great variety of techniques to measure distances over various ranges in numerous fields and applications, including robotics and machine vision. An overview of a number of these techniques is found in _"Where am I" Systems and Technologies for Mobile Robot Positioning_, J. Borenstein, H. R. Everett, and L. Feng, A. K. Peters, Ltd., University of Michigan for the Oak Ridge National Lab (ORNL) D&D Program, Published by Wellesley, Mass., copyright April 1996.

In the present case, we are interested in determining distances that fall between the macroscopic and microscopic, e.g., distances on the order of a few centimeters or meters. More specifically, of particular interest are techniques that use optical beams and can perform accurate distance measurements in this intermediate distance range.

One of the approaches taught by the prior art is based on optical ranging cameras or range-finding camera systems. Some examples of such cameras and systems are described in U.S. Pat. Nos. 6,057,909; 6,034,716; 5,200,793 and by S. Christie, et al., in _Measurement Science and Technology_ 6, September 1995, pp. 1301–1308. These systems are too cumbersome when a distance to one or just a few particular points or objects needs to be measured and no image of the scene is required.

Another approach taught by the prior art is based on scanning systems that use beams to determine distance. Most of these systems use the time-of-flight or propagation delay time to derive distance to the object. Several examples of corresponding apparatus and methods are found in U.S. Pat. Nos. 6,710,859; 6,064,471; 6,057,910; 5,959,734; 5,831,717; 5,724,123; 5,648,852 and 5,477,461. More sophisticated approaches using scanning are discussed in greater detail in a paper by Johnny Park, et al., "Dual-Beam Structured Light Scanning for 3-D Object Modeling", Third International Conference on 3-D Imaging and Modeling, Proceedings May 28, 2001–Jun. 1, 2001, pp. 65–72.

Unfortunately, most of the prior art approaches using scanning beams are not suitable for use in simple and low-cost systems for accurate determination of medium-range distances to stationary or moving objects. Specifically, many of these techniques, including time-of-flight or propagation time delay, are not suitable or not sufficiently accurate for measuring distances in the intermediate distance range.

OBJECTS AND ADVANTAGES

It is an object of the present invention to provide a simple, easy-to-use and low-cost system for determining distances to a stationary or moving object. More specifically, it is an object of the invention to provide a simple apparatus and method to determine a distance to a feature with the aid of a small number of optical beams propagating in a certain relationship to each other. The method and apparatus are particularly well-adapted for determination of intermediate distances extending from a few centimeters to a few meters.

SUMMARY

An apparatus and a method optically determine a distance r to a feature from an origin or a center. In one embodiment the apparatus has a beam generation unit for launching a reference beam on a reference path and a first beam on a first path. The center from which distance r is determined is selected such that it is along a line of the reference path and not along a line of the first path. In other words a line of the reference path intersects the center and a line of the first path does not. A rotation mechanism rotates the reference path and the first path about the center. As they rotate, the reference beam moves over the feature at a reference time $t_r$ and the first beam moves over the feature at a first time $t_1$. The apparatus has a determination unit for determining distance r between the center and the feature from angular velocity $\omega$ of the reference beam and first beam while they move over the feature and from times $t_r$, $t_1$. In particular, a transverse velocity v of the reference beam over the feature is obtained from times $t_r$ and $t_1$. Distance r is determined from angular and transverse velocities $\omega$, v with the aid of the well-known equation:

$$r = \frac{v}{\omega}.$$

Angular velocity $\omega$ of the beams can be obtained from times $t_r$, $t_1$ in some embodiments. Alternatively, an angular velocity unit measures angular velocity $\omega$ of the reference beam over the feature and communicates it to the determination unit.

The reference path and the first path can have folded path portions depending on the construction and application of the apparatus. Similarly, the rotation mechanism can be simple or complex and can take advantage of one or more elements such as mirrors, refractive elements, diffractive elements and holographic elements as well as any combination of such elements.

In a preferred embodiment the reference path and the first path are in a common plane $\Sigma$. In other words, reference beam and first beam are coplanar as they propagate to the feature. It should be noted that reference and first paths do not need to be coplanar in all embodiments, especially when the feature is large.

The determination unit has a detector for detecting radiation or light from the reference beam and the first beam which has interacted with the feature. When the feature is a waveguide or a hole, then the detector can observe radiation of the reference and first beams directly as they move over the feature. In other words, determination unit can either detect the reference and first beams as they move over the feature or it can detect scattered portions of reference and first beams at some distance away from the feature.

In the preferred embodiment the beam generation unit has a reference source for launching the reference beam and a first source for launching the first beam. The sources can be dedicated or they can be part of an active array of sources such as an array of Vertical Cavity Surface Emitting Lasers (VCSELs). It is further preferred that the reference source and the first source have distinct generation modes so as to endow the reference beam and first beam with mutually distinguishing properties. For example, the distinguishing properties can be polarizations, wavelengths, temporal beam formats, intensities, or any of various well-known types of optical modulation. When using wavelength as the distinguishing property, the determination unit can use a reference detector and a first detector as well as a wavelength filter or arrangement of wavelength filters to detect the reference beam and the first beam. Appropriate filters are used to separate polarizations when the distinguishing property is polarization. Alternatively, the detection unit can use the same detector without filters when the distinguishing property is a temporal beam format or intensity.

In the preferred embodiment, the beam generation unit additionally launches a second beam on a second path that also rotates about the center. The second path is chosen such that the center is along a line of the second path, or such that a line of the second path intersects the center. As it rotates, the second beam moves over the feature at a second time $t_2$. The determination unit determines from times $t_r$ and $t_2$ the angular velocity $\omega$ of the beams as they move over the feature. In this embodiment the beam generation unit comprises a second source for launching the second beam. It is preferred that the second source possess a distinct generation mode for endowing the second beam with a distinguishing property such as wavelength, polarization, temporal beam format, intensity or modulation, which distinguishes the second beam from the reference beam and/or first beam. It is further preferred that second path be in common plane $\Sigma$ shared by reference and first paths. Note, however, that reference, first, and second paths do not need to be coplanar in all embodiments, especially when the feature is large. More specifically, when the feature is a micro-structure, all beams are preferably coplanar, i.e., they are in common plane $\Sigma$. When the feature is a macro-structure, such as an edge of an object, then the beams do not need to be coplanar.

In some alternative embodiments an apparatus to determine distance r to the feature from the center can operate without launching any beams, instead relying on external or ambient radiation. Such an apparatus has a radiation detection unit for selectively detecting radiation on the reference path and on the first path. As before, a line along the reference path intersects the center and a line along the first path does not. The rotation mechanism rotates the reference path and the first path about the center. Radiation from the feature is detected on the reference path at a reference time $t_r$ and on the first path at a first time $t_1$. The determination unit determines distance r from the center to the feature from transverse velocity v and angular velocity $\omega$ of the reference path as it moves over the feature. Transverse velocity v is obtained from times $t_r$, $t_1$. Angular velocity $\omega$ can be determined from times $t_r$, $t_1$. In other embodiments, angular velocity $\omega$ is obtained from an angular velocity measurement unit. In still other embodiments angular velocity $\omega$ is obtained by detecting radiation on a second beam path.

In some embodiments distance r from a center to a feature is determined by launching a reference beam on a reference path and a first beam on a first path. The center is selected to be collinear with the reference path and non-collinear with the first path. The reference and first paths are rotated about the center. They move over the feature at reference and first times $t_r$ and $t_1$. Distance r is determined from angular velocity $\omega$ of the reference beam over the feature.

Transverse velocity v is obtained from times $t_r$, $t_1$. Among other alternatives, angular velocity $\omega$ can be obtained from times $t_r$, $t_1$ or by measuring it with an angular velocity unit. In still other alternative embodiments, the location of center C can be selected to be non-collinear with the reference path and non-collinear with the first path.

In accordance with the method, non-collinear folded path portions can be added on to the reference or first paths, depending on conditions and application. In a preferred method the reference and first paths are arranged in common plane $\Sigma$ and are endowed with mutually distinguishing properties. Further, a preferred method employs a second beam launched on a second path chosen such that the center is along a line along the second path to determine angular velocity $\omega$ of the reference beam. More precisely, the second path is rotated along with reference and first paths about the center such that the second beam moves over the feature. The second beam passes over the feature at a second time $t_2$. Angular velocity $\omega$ is determined from times $t_r$, $t_2$.

It should be noted that times $t_r$, $t_1$ and $t_2$ mark the events when the respective optical paths move transversely across the feature and thus interact with the feature. An optical signal emanating from this interaction may take the form of any measurable changes in an optical characteristic, i.e., amplitude, phase, polarization, wavelength, etc. For example, the feature may comprise a retro-reflecting or highly scattering surface, thereby increasing the detected signal to mark this event. In another cases, the feature has absorption properties, such that the event is marked by a decrease in optical signal. In still other cases, these event times could include the capturing and processing of images of the feature and the spots of light moving across the feature.

Alternative methods of the invention can determine distance r to the feature from the center without launching any beams, instead relying on external or ambient radiation. Such methods rely on radiation from the feature detected on a reference and first paths. The paths are arranged such that the center is along a line of the reference path and not along a line of the first path. In still other embodiments, the reference path and the first path can be arranged such that the center is no along either the line of the reference path or the first path.

The reader will develop an appreciation for the invention from the detailed description and the appended drawing figures.

DETAILED DESCRIPTION

Figure 1:
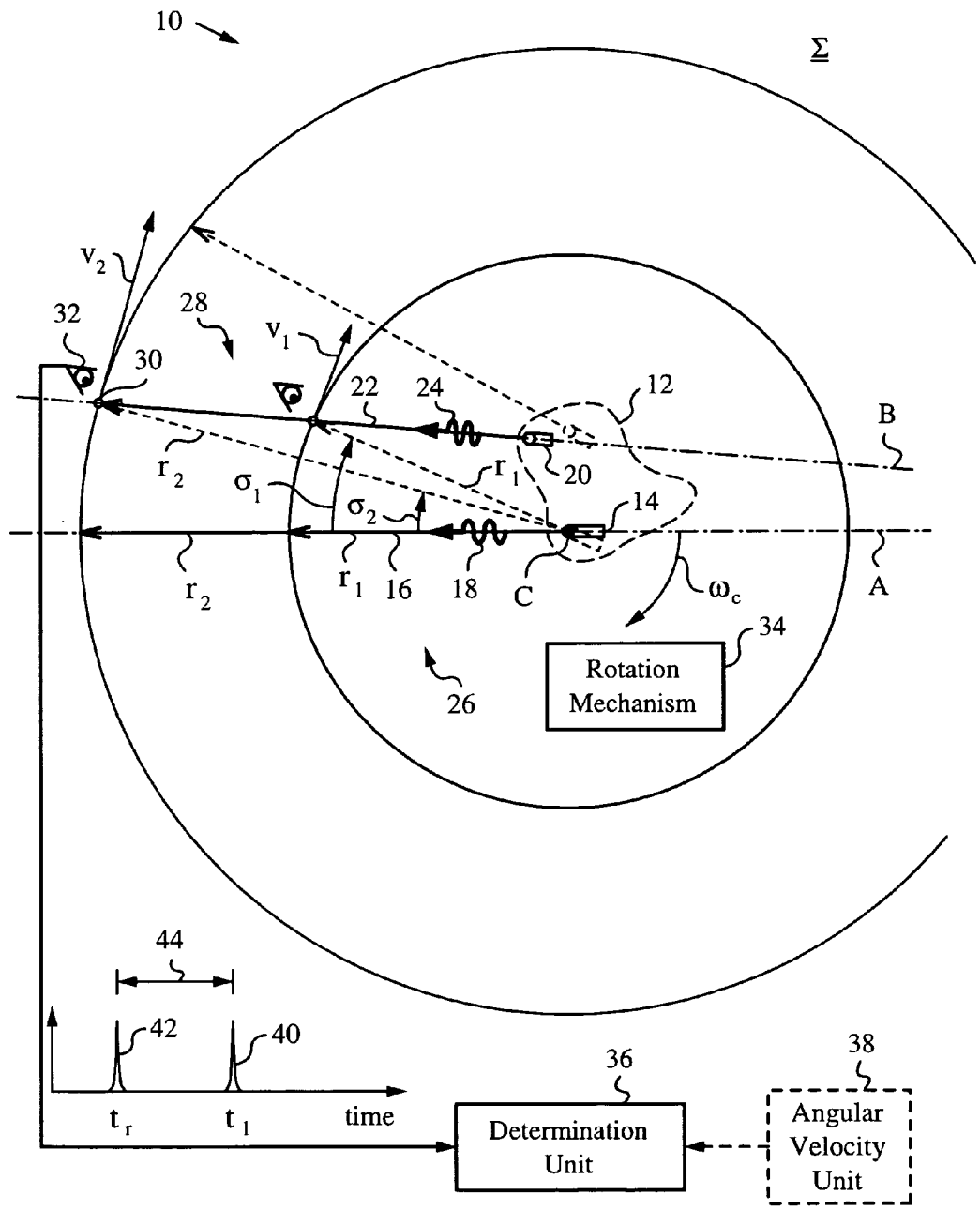
FIG. 1 is a schematic diagram illustrating the principles of operation of an apparatus according to the invention.

The present invention will be best understood by initially reviewing the schematic diagram in FIG. 1 illustrating the basic principles of an apparatus 10 according to one embodiment of the invention. Apparatus 10 has a beam generation unit 12 with a reference source 14 for launching a reference beam 16 of optical radiation 18. Unit 12 also has a first source 20 for launching a first beam 22 of optical radiation 24. Reference beam 16 is launched on a reference path 26 and first beam 22 is launched on a first path 28.

A distance r is defined from a center C to a feature 30. Feature 30 can be a micro-structure or a macro-structure and it can be permanent, temporary, fixed or moving. In the present case feature 30 is a micro-structure, and more precisely a scattering point that scatters radiation 18 and 24.

Center C is selected such that it is along a line A of reference path 26 and not along a line B of first path 28. In other words, center C is on a line A that is collinear with reference path 26. Note that although in the figure center C is located at a point where reference beam 16 actually propagates it can also be located at a point beyond the line segment corresponding to reference path 26. In addition, center C is not on a line B that is collinear with first path 28. Note that lines A and B can have any relationship to each other, including being parallel. In the present embodiment, lines A and B are in a common plane Σ and they are not parallel. Thus, reference path 26 and first path 28 are in plane Σ. Also, in the present embodiment, reference source 14 is located at center C.

Reference source 14 and first source 20 have mutually distinct generation modes for endowing reference beam 16 and first beam 22 with mutually distinguishing properties. In the present case sources 14, 20 are lasers that emit radiation 18, 24 at different wavelengths and the distinguishing properties are wavelengths. A detector 32 positioned at feature 30 uses wavelengths of radiation 18 and radiation 24 to differentiate beam 16 from beam 22.

Apparatus 10 has a rotation mechanism 34 that rotates reference path 26 and first path 28 about center C. The rotation is performed such that reference beam 16 and first beam 22 move over feature 30. Beams 16 and 22 pass over feature 30 at a reference time $t_r$ and at a first time $t_1$. In the present embodiment, rotation mechanism 34 rotates paths 26, 28 at a constant angular velocity $\omega_c$.

Apparatus 10 has a determination unit 36 for determining distance r between center C and feature 30 from a transverse velocity v and an angular velocity ω of reference beam 16 as it moves over feature 30. Transverse velocity v of the reference beam is obtained from times $t_r$ and $t_1$. Angular velocity ω of reference beam 16 can also be obtained from times $t_r$, $t_1$ or from an angular velocity unit 38. When used, angular velocity unit 38 is in communication with determination unit 36. Unit 38 can obtain angular velocity ω by communicating with rotation mechanism 34 or through independent observation.

During operation, detector 32 detects beams 16 and 22 at times $t_r$ and $t_1$ when they move over feature 30. In FIG. 1 detector 32 is detecting first beam 22 at time $t_1$ and sending a corresponding signal 40 to determination unit 36. After rotation through angle $\sigma_2$ detector 32 detects reference beam 16 and sends a corresponding signal 42 to determination unit 36.

In the embodiment shown, feature 30 is at a distance $r_2$ from center C. For comparison, feature 30 is also shown at a shorter distance $r_1$ from center C. When feature 30 is at distance $r_2$ the angle through which rotation mechanism 34 has to rotate paths 26, 28 between detection of beam 22 and then beam 16 by detector 32 is $\sigma_2$. When feature 30 is at distance $r_1$ the angle through which rotation mechanism 34 has to rotate paths 26, 28 between detection of beam 22 and beam 16 is $\sigma_1$. Note that angles $\sigma_1$ and $\sigma_2$ are different. In fact, for any specific distance r between center C and feature 30, angle σ has a unique value.

Rotation mechanism 34 requires different amounts of time to rotate paths 26, 28 through different angles σ as it rotates at constant angular velocity $\Omega_c$. Thus, a time interval 44 between times $t_1$ and $t_r$ is unique for each value of angle σ. The equation for time interval 44 can be expressed as:

$$|t_1 - t_r| = \frac{\sigma}{\omega_c} \quad \text{(Eq. 1)}$$

Thus, when rotating at constant angular velocity $\omega_c$, interval 44 between times $t_1$ and $t_r$ when feature 30 is at distance $r_1$ is $\sigma_1/\omega_c$. On the other hand, when feature 30 is at distance $r_2$ time interval 44 is $\sigma_2/\omega_c$. In addition, transverse velocity v at which reference beam 16 moves over feature 30 changes with distance r as follows:

$$v = \frac{r\sigma}{|t_1 - t_r|} = r\omega_c. \quad \text{(Eq. 2)}$$

In the present case, transverse velocity v is $v_1$ at distance $r_1$ and $v_2$ at distance $r_2$.

In general, knowledge of the geometric relationship between reference path 26 and first path 28 (i.e., the relative positions of lines A and B and the position of center C) provides an equation that describes transverse velocity v of reference beam 16 moving over feature 30 as a function of distance r and of angular velocity ω. Therefore, knowledge of angular velocity ω, the relationship between paths 26, 28 and times $t_r$, $t_1$ is sufficient to determine distance r. Since in the present embodiment angular velocity ω is constant, i.e., $\omega = \omega_c$, the interval between successive times $t_r$ measures the period and can thus be used to obtain angular velocity $\omega_c$.

Now, knowledge of times $t_r$ and $t_1$ is sufficient to determine distance r. Alternatively, when angular velocity ω is not constant, then its value as beams 16, 22 move over feature 30 should be measured by unit 38.

Determination unit 36 uses angular velocity ω and transverse velocity v of reference beam 16 moving over feature 30 to compute distance r. More precisely, equation 2 is based on the relationship:

$$r = \frac{v}{\omega}. \qquad \text{(Eq. 3)}$$

Figure 2:
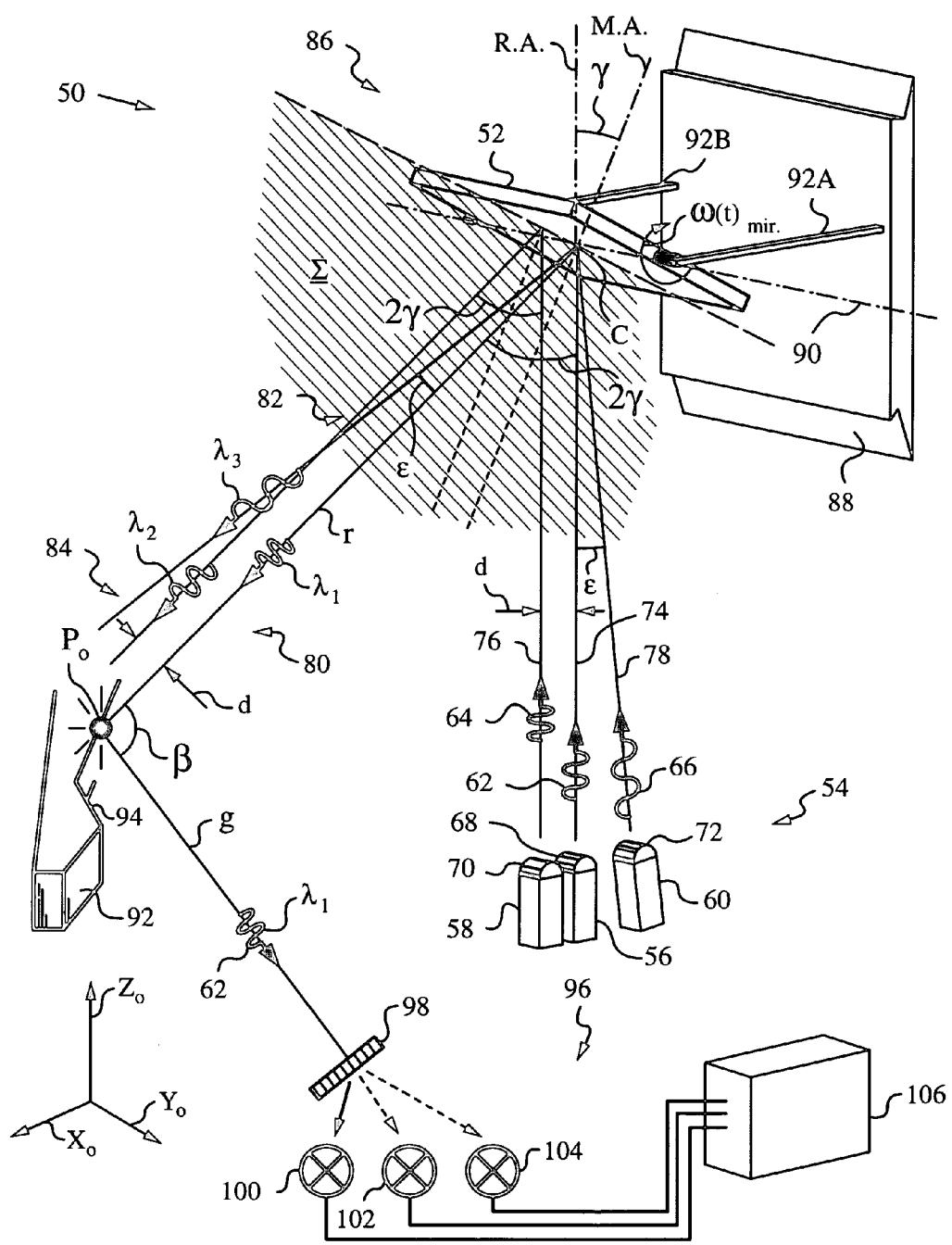
FIG. 2 is a three-dimensional view of an apparatus according to the invention employing a mirror for rotating the optical paths.

The principles of invention can be used in a wide variety of apparatus and methods. FIG. 2 illustrates a three-dimensional view of an apparatus 50 according to the invention employing a flat mirror 52 for rotating the optical paths. Apparatus 50 has a beam generation unit 54 equipped with a reference source 56, a first source 58 and a second source 60 for generating reference, first and second radiation 62, 64, and 66. Sources 56, 58 and 60 have optics 68, 70, 72 for collimating radiation 62, 64, 66 into reference, first and second beams 74, 76 and 78.

Sources 56, 58, 60 have mutually distinct generation modes to endow radiation 62, 64, 66 with mutually distinguishing properties. Specifically, sources 56, 58, 60 emit at mutually distinct wavelengths such that radiation 62 has a first wavelength $\lambda_1$, radiation 64 has a second wavelength $\lambda_2$ and radiation 66 has a third wavelength $\lambda_3$. Sources 56, 58, 60 can be Vertical Cavity Surface Emitting Lasers (VCSELs), light emitting diodes (LEDs) or other suitable emitters. Note that sources 56, 58, 60 can take advantage of other distinct generation modes to take advantage of other distinguishing properties such as polarization or intensity of radiation 62, 64, 66 or the temporal format of beams 74, 76, 78 such as pulse repetition rate or any well-known optical modulation. Alternatively, radiation 62, 64, 66 can be endowed with a distinguishing property by optics 68, 70, 72 and/or other optical elements including but not limited to optical filters, choppers, multiplexers and polarization rotators. A person skilled in the art will appreciate that still other alternatives exist for making radiation 68, 70, 72 distinguishable.

Beam generation unit 54 uses its sources 56, 58, 60 to launch reference beam 74 on a reference path 80, first beam 76 on a first path 82, and second beam 78 on a second path 84. A center C chosen in the center of mirror 52 lies along a line of path 80 and not along a line of first path 82. More precisely, path 82 is parallel to reference path 80 and offset from it by a distance d. Second path 84 is chosen such that center C is collinear with it. Specifically, second path 84 passes through center C and preserves an angle ε to reference path 80. This is accomplished by ensuring that sources 56, 58, 60 emit reference and first beams 74, 78 in parallel at offset d and second beam 78 at angle ε to reference beam 74.

The reflective action of mirror 52 redirects or folds paths 80, 82, 84. Thus, paths 80, 82, 84 have non-collinear folded portions between sources 56, 58, 60 and mirror 52. It is important to note that the non-collinear folded portions are not used in the calculation of a distance r from center C to a feature 94.

Because incident and reflected angles are equal and mirror 52 is flat, offset d between beams 74 and 76 and angle ε between beams 74 and 78 are preserved on reflection. Note that in this embodiment paths 80, 82, 84 are in a common plane Σ, or, equivalently, beams 74, 76, 78 are confined to propagate in plane Σ.

A rotation mechanism 86 uses mirror 52 for rotating reference path 80, first path 82, and second path 84 about center C. Mechanism 86 has a driver 88 for rotating mirror 52 about an axis of rotation 90 collinear with center C. Mirror 52 is suspended on hinges 92A, 92B. Mirror 52 has a mirror axis M.A. perpendicular to mirror surface, passing through center C and axis of rotation 90. A reference axis R.A. defines the neutral or unrotated position of mirror 52. Driver 88 rotates mirror 52 by introducing a time-varying mirror rotation angle γ between mirror axis M.A. and reference axis R.A. about axis of rotation 90.

Distance r is defined from center C to feature 94. In the present case feature 94 is a macro-structure. More precisely, feature 94 is an edge of object 92 that scatters radiation 62, 64 and 66. The point on edge 94 from which beams 74, 76, 78 scatter is called scattering point $P_o$. Thus, distance r is defined between center C and scattering point $P_o$. Note that object 92 can be stationary or moving, and temporary or permanent. Conveniently, the position of point $P_o$ on edge 94 is described in world coordinates $(X_o, Y_o, Z_o)$.

Apparatus 50 has a detection unit 96 for detecting radiation 62, 64, 66 produced when beams 74, 76, 78 move over and scatter from point $P_o$. Detection unit 96 intercepts scattered radiation 62, 64, 66 arriving from point $P_o$ along path g. Detection unit 96 has a wavelength filter 98 that is sensitive to wavelengths $\lambda_1, \lambda_2, \lambda_3$ of radiation 62, 64, 66 of beams 74, 76 and 78. In particular, filter 98 spatially separates radiation 62, 64, 66 according to wavelength and sends radiation 62 to reference detector 100, radiation 64 to first detector 102 and radiation 66 to second detector 104.

Detectors 100, 102, 104 are connected to a determination unit 106. Determination unit 106 obtains a first time $t_1$, a second time $t_2$ and a third time $t_3$ when reference, first and second beams 74, 76, 78 move over edge 94 and radiation 62, 64, 66 scatters from point $P_o$ toward detection unit 96. Note that times $t_1$, $t_2$ and $t_3$ correspond to detection signals produced by detectors 102, 104, 106 after propagation time delay Δt due to time-of-flight along path g.

During operation beam generation unit 54 launches beams 74, 76, 78 on reference, first and second paths 80, 82, 84. Mirror 52 reflects beams 74, 76, 78 while preserving offset d and angle ε. At mirror rotation angle γ beams 74, 76, 78 are reflected such that the optical angles between incident and reflected beams 74, 76 are 2γ and the optical angle between incident and reflected beam 78 is 2(γ+ε).

Rotation mechanism 86 rotates reference, first and second paths 80, 82, 84 about center C. Specifically, driver 88 of mechanism 86 rotates mirror 52 to yield a time varying mirror rotation angle γ(t). Preferably, rotation angle γ(t) is varied in a continuous manner such that mirror 52 rotates about axis of rotation 90 at an angular velocity $\omega(t)_{mir}$ that also varies in a continuous manner. In this embodiment driver 88 varies rotation angle γ(t) in a sinusoidal manner as follows:

$$\omega(t)_{mir} = \dot{\gamma}(t) = A \sin(\omega_{mir} t) \qquad \text{(Eq. 4)}$$

where A is the amplitude of oscillation and the dot represents the first time derivative. Amplitude A is sufficiently large to ensure that beams 74, 76, 78 all move over point $P_o$ during each up and down oscillation or swing of mirror 52. Note that angular velocity $\omega(t)_{beam}$ of beams 74, 76, 78 moving over point $P_o$ is twice angular velocity $\omega(t)_{mir}$ of mirror 52.

That is because optical rotation angles correspond to twice mirror rotation angle γ due to the law of reflection.

Figure 3:
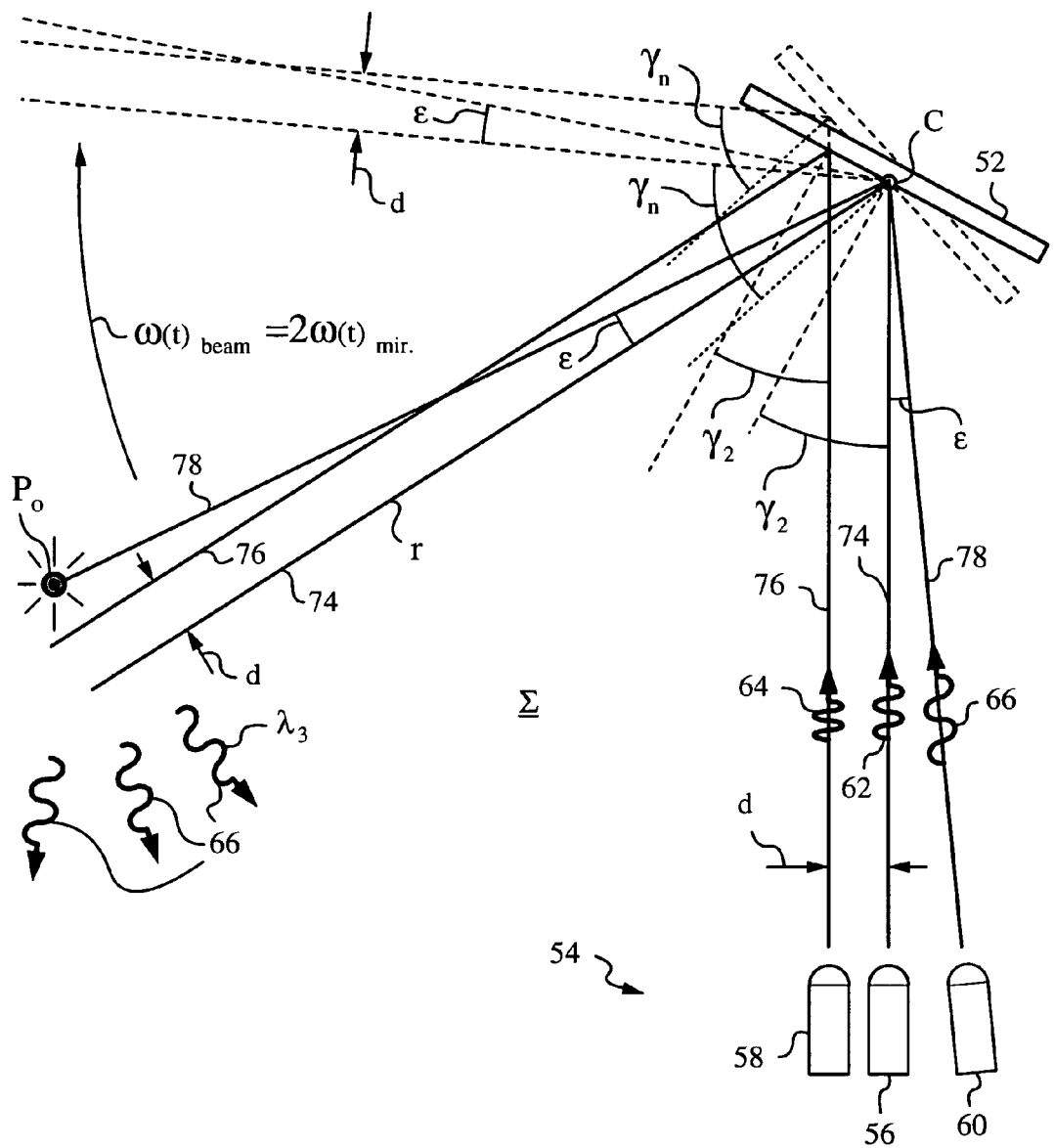
FIG. 3 is a cross-sectional side view of the apparatus of FIG. 2 in plane $\Sigma$.

The cross-sectional side view of FIG. 3 taken in plane Σ illustrates how beams 74, 76, 78 move over point $P_o$ and scatter from it during an upswing in the following order: second beam 78, first beam 76, and reference beam 74. Thus, during the upswing times $t_r$, $t_1$ and $t_2$ occur in the corresponding succession: $t_2$, $t_1$ and $t_r$. In FIG. 3 scattering of second beam 78 at time $t_2$ occurs at mirror rotation angle $\gamma_2$. At a larger mirror rotation angle $\gamma_n$ during the up swing all beams 74, 76, 78 have moved beyond point $P_o$ and have already scattered.

Figure 4A:
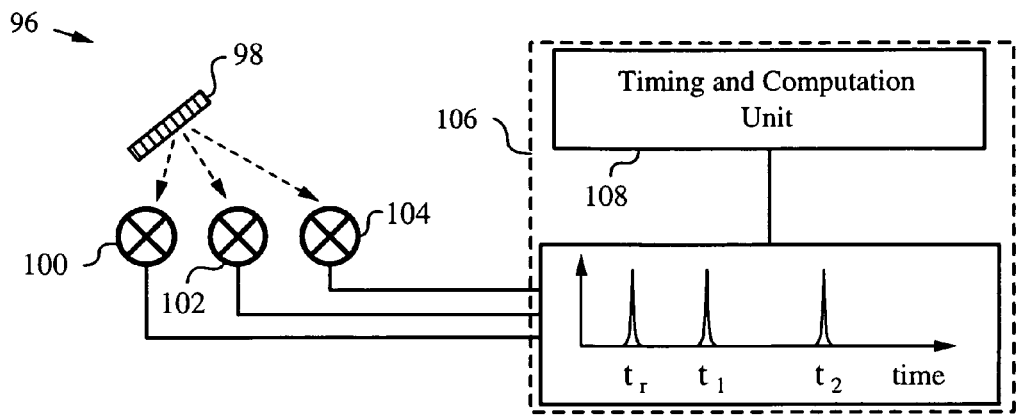
FIG. 4A is a diagram of the detection unit belonging to the apparatus of FIG. 2.

A diagram of detection unit 96 in FIG. 4A shows the succession of times $t_2$, $t_1$ and $t_r$ at which detection signals are obtained from detectors 100, 102, 104 by determination unit 106. Determination unit 106 determines distance r to point $P_o$ from times $t_2$, $t_1$ and $t_r$. The determination is made by a timing and computation unit 108, which belongs to unit 106. Unit 108 employs the following equations in its determination:

$$\omega_{beam} = \frac{\varepsilon}{|t_2 - t_r|}, \quad (Eq. 5)$$

$$v_{beam} = \frac{d}{|t_1 - t_r|}, \text{ and} \quad (Eq. 6)$$

$$r = \frac{v_{beam}}{\omega_{beam}} = \frac{d|t_2 - t_r|}{\varepsilon|t_1 - t_r|}, \quad (Eq. 7)$$

where $v_{beam}$ is the linear velocity and $\omega_{beam}$ is the angular velocity of reference beam 74 as it moves over point $P_o$ of edge 94. It should be noted that the measurement of distance r can be performed any time beams 74, 76, 78 move over and scatter from point $P_o$ on edge 94. For the measurement to be accurate the instantaneous linear and angular velocities $v_{beam}$, $\omega_{beam}$ should be substantially constant while beams 74, 76, 78 are moving over point $P_o$. In an alternative approach, the time intervals between times $t_1$, $t_r$ and $t_2$, $t_r$ can be expressed without taking their absolute values. This can be done to obtain additional information from the order in which beams 74, 76, 78 scatter. For example, the sign (positive or negative) of the time intervals can indicate whether distance r was determined on an up- or downswing of mirror 52.

Figure 5:
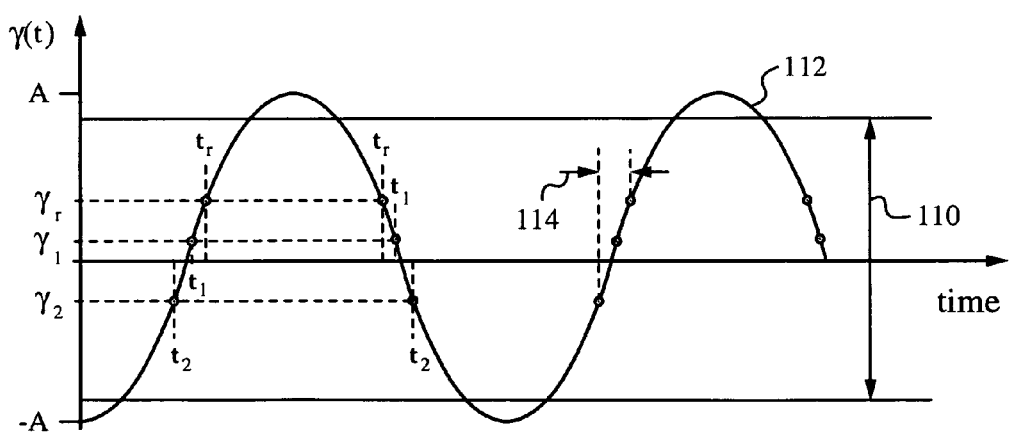
FIG. 5 is a graph of the mirror rotation angle γ(t) during sinusoidal oscillation.

In the present embodiment, since mirror rotation angle γ(t) varies in a sinusoidal manner, the condition of substantially constant instantaneous linear and angular velocities $v_{beam}$, $\omega_{beam}$ is met in a linear region 110 of the sinusoidal oscillation of mirror 52. Linear region 110 corresponds to a distance of about 1.72 A, as better shown by graph 112 of mirror rotation angle γ(t) in FIG. 5. In fact, FIG. 5 illustrates a desirable situation where times $t_r$, $t_1$, $t_2$ all fall within linear region 110.

Since equation 7 yields distance r from times $t_r$, $t_1$, $t_2$ at which optical angles are $2\gamma_r$, $2\gamma_1$, $2\gamma_2$ (since optical angle is twice mirror rotation angle γ) it is not necessary to supervise the angular velocity of mirror 52. Note that a total time interval 114 during which times $t_2$, $t_1$ and $t_r$ are measured is short in comparison to the time required to complete an up- or downswing.

The measurement of distance r can be performed during an upswing or downswing of mirror 52. During the upswing the order of times is $t_2$, $t_1$, $t_r$ while during a downswing the order reverses to $t_r$, $t_1$, $t_2$. In situations when object 92 is moving the oscillation time of mirror 52 should be short to enable monitoring of movement of object 92 based on changing distance r to edge 94.

Figure 4B:
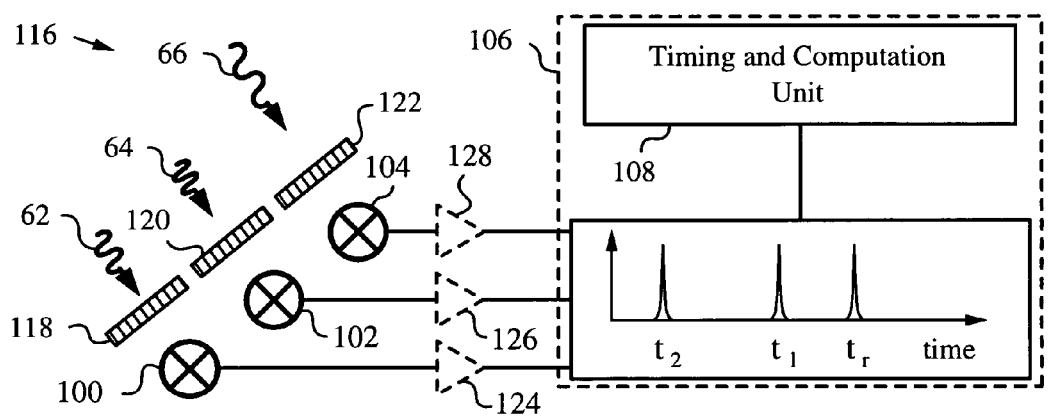
FIG. 4B is a diagram of an alternative detection unit that can be used by the apparatus of FIG. 2.

An alternative detection unit 116 that can be used in place of unit 96 is illustrated in FIG. 4B, where corresponding parts are referred to with the same reference numerals. Unit 116 has wavelength filters 118, 120, 122 whose passbands are chosen to only pass radiation 62, 64, 66 respectively. In other words, filter 118 has a passband at $\lambda_1$, filter 120 has a passband at $\lambda_2$, and filter 122 has a passband at $\lambda_3$. Three detectors 100, 102, 104 dedicated to receiving radiation 62, 64, 66 of scattered beams 74, 76, 78 are placed behind filters 118, 120, 122. Optional amplifiers 124, 126, 128 indicated in dashed lines can be provided for amplifying the signals sent to unit 106. The remaining portion of detection unit 116, namely determination unit 106 and timing and computation unit 108 operate as described above. Note that unit 116 is in the process of receiving scattered radiation 62, 64, 66 at times $t_r$, $t_1$, $t_2$ or in the order corresponding to a down swing of mirror 52.

Figure 6:
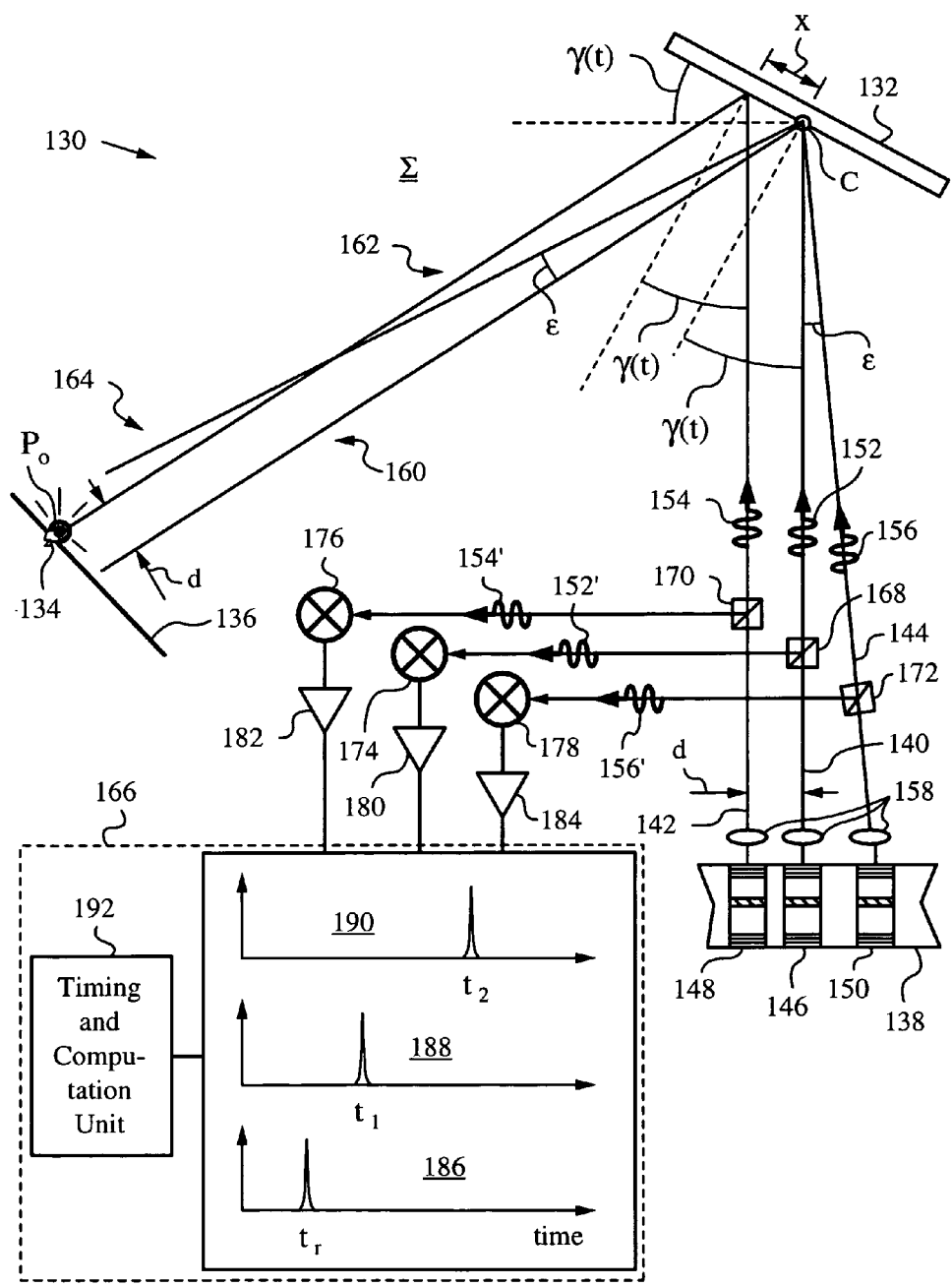
FIG. 6 is a cross-sectional side view of another apparatus according to the invention in plane Σ.

FIG. 6 illustrates another apparatus 130 for determining a distance r from a center C of a mirror 132 to a feature 134 of an object 136. Apparatus 130 has a beam generation unit 138 for generating a reference, first and second beams 140, 142, 144. In this embodiment unit 138 is an active array of three sources 146, 148, 150 emitting radiation 152, 154, 156. Sources 146, 148, 150 are active Fabry-Perot type resonators.

Beam generation unit 138 uses sources 146, 148, 150 and optics 158 for launching beams 140, 142, 144 on reference, first and second paths 160, 162 and 164. Paths 160, 162 and 164 have non-collinear folded path portions commencing at sources 146, 148, 150 and terminating at the points of reflection from mirror 132 like the embodiment shown in FIG. 2. Reference path 160 and second path 164 lie along lines that intersect with center C. Indeed, these lines intersect at center C. Meanwhile, first path 162 is along a line intersecting with center C. Center C is chosen at the center of mirror 132 and on its axis of rotation perpendicular to the paper plane. Optics 158 ensure that paths 160, 162 preserve an offset d while paths 160, 164 preserve an angle ε. Thus, reference and first beams 140, 142 propagate in parallel at offset d and second beam 144 propagates at angle ε to reference beam 140.

The reflective action of mirror 132 redirects or folds paths 160, 162, 164. Thus, paths 160, 162, 164 have non-collinear folded portions between sources 146, 148, 150 and mirror 132. Because incident and reflected angles are equal and mirror 132 is flat, offset d between beams 140 and 142 and angle ε between beams 140 and 144 are preserved on reflection. Note that in this embodiment paths 160, 162, 164 are in a common plane Σ, or, equivalently, beams 140, 142, 144 are confined to propagate in plane Σ.

A rotation mechanism (not shown) uses mirror 132 for rotating reference path 160, first path 162, and second path 164 about center C. The mechanism accomplishes this by rotating mirror 132 about the axis of rotation collinear with center C. The rotation is performed such that reference, first and second beams 140, 142, 144 scatter from feature 134 or scattering point $P_o$ thereon. Beams 140, 142, 144 scatter at reference, first and second times $t_r$, $t_1$, $t_2$, respectively. Beams 140, 144 reflect from the center of mirror 132. Beam 142 reflects from another point at a distance x from the center of mirror 132, where:

$$x = \frac{d}{\cos\gamma(t)} \quad \text{(Eq. 8)}$$

and γ(t) is the mirror rotation angle which is varied in time by the rotation mechanism.

Apparatus 130 has a determination unit 166 for determining distance r from reference, first and second times $t_r$, $t_1$, $t_2$. Unit 166 examines back-scattered radiation 152', 154' and 156' returning from point $P_o$ along the original paths 160, 162, 164. Apparatus 130 has three beam splitters 168, 170, 172 for guiding back-scattered radiation 152', 154' and 156' to its reference, first and second detectors 174, 176, 178 to generate corresponding detection signals.

In this embodiment no distinguishing property between radiation 152, 154 and 156 is required. That is because only back-scattered radiation 152', 154', 156' returning along the paths 160, 162, 164 is deflected by corresponding beam splitter 168, 170, 172 to dedicated detector 174, 176, 178 and produces a corresponding detection signal. A person skilled in the art will recognize that elements such as apertures can be used to further improve performance by eliminating any stray back-scattered radiation that is not returning along the original path. For example, apertures placed by the detectors and focusing optics placed along the paths in confocal arrangements can be used for these purposes.

The detection signals produced by detectors 174, 176, 178 are amplified by amplifiers 180, 182, 184 and delivered to determination unit 166. Unit 166 has dedicated channels 186, 188, 190 for registering amplified signals from detectors 174, 176, 178. Unit 166 obtains reference time $t_r$, first time $t_1$ and second time $t_2$ when beams 140, 142, 144, respectively, scatter from point $P_o$ from the amplified signals registered in channels 186, 188, 190. Note that times $t_r$, $t_1$ and $t_2$ correspond to detection signals produced by detectors 174, 176, 178 after time delay Δt due to time-of-flight along paths 160, 162, 164. From times $t_r$, $t_1$ and $t_2$ determination unit 166 determines distance r from center C to point $P_o$. The determination of distance r is made by a timing and computation unit 192, which belongs to unit 166. Unit 192 employs equation 7 in its determination.

Apparatus 130 is compact and can be used to measure distance r from center C to moving or stationary feature 134. In this embodiment feature 134 is a structure that scatters radiation 152, 154, 156 at point $P_o$. More precisely, feature 134 is a micro-structure 156 corresponding to a texture, and still more specifically to an imperfection in object 136. Object 136 is a surface. Imperfection 134 causes beams 142, 144, 146 to scatter as they move over it and thus change the intensity of back scattered radiation 152', 154', 156'. Note that the texture of micro-structure 134 that alters the scattering of beams 142, 144, 148 can include properties such as surface roughness, embedded scattering centers, retroreflecting microspheres or any other textural features. It should also be noted, that certain micro-structures can become resolvable when the spot size of the beams is focused to an appropriately small size.

During operation rotation angle γ(t) of mirror 132 is varied such that all three beams 140, 142, 144 move over or are scanned across point $P_o$. The measurement of distance r can be performed any time beams 140, 142, 144 move across and scatter from point $P_o$. As remarked above, the linear and angular velocities $v_{beam}$, $\omega_{beam}$ should be substantially constant while beams 140, 142, 144 are moving over point $P_o$ to provide an accurate measurement.

Figure 7:
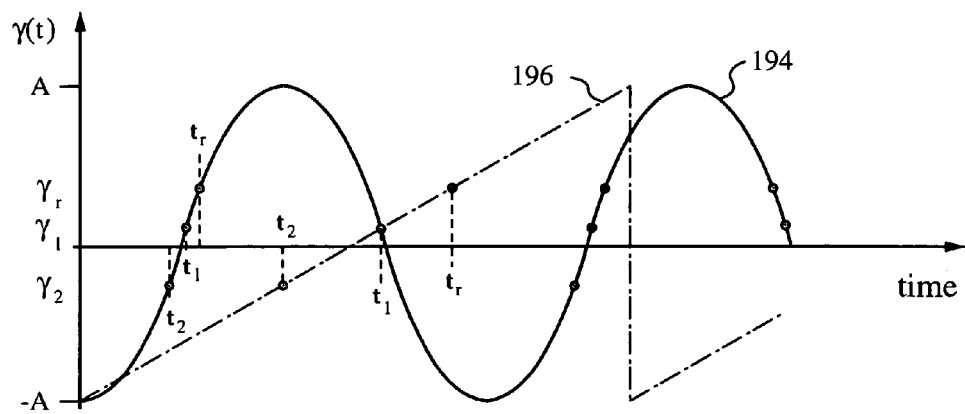
FIG. 7 is a graph of the mirror rotation angle γ(t) during sinusoidal and saw-tooth type oscillation.

The variation of mirror rotation angle γ(t) can be sinusoidal, linear, or it can be governed by some other continuous function. FIG. 7 illustrates an exemplary sinusoidal variation 194 of rotation angle γ(t) and an exemplary saw-tooth variation 196 of rotation angle γ(t) for comparison. Note that saw-tooth variation 196 is continuous and linear over its entire swing range from −A to A, i.e., 2 A, while sinusoidal variation 194 is linear over 1.72 A only. Thus, saw-tooth variation 196 can be used for detecting scattering point $P_o$ over a wider angular range.

Figure 8:
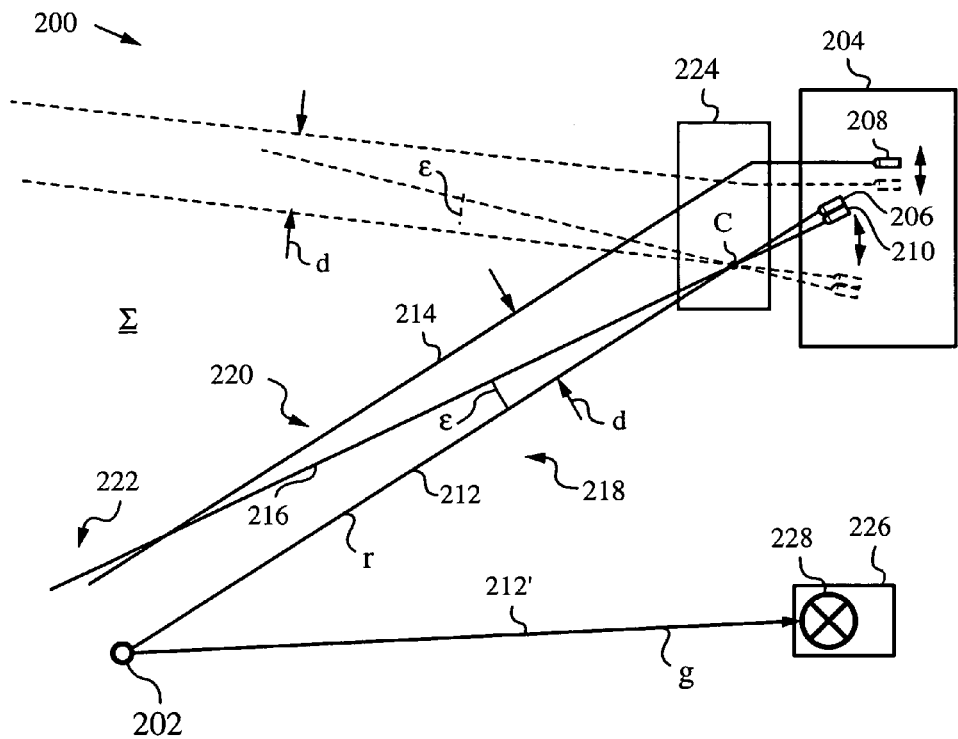
FIG. 8 is a cross-sectional side view of an alternative apparatus according to the invention in plane Σ.

FIG. 8 illustrates a cross-sectional side view in plane Σ of another apparatus 200 for measuring a distance r from a center C to a feature 202. Apparatus 200 has a beam generation unit 204 equipped with sources 206, 208, 210 for launching reference, first and second beams 212, 214, 216, respectively. Reference, first and second paths 218, 220, 222 are provided for beams 212, 214, 216 to feature 202. Reference path 218 and second path 222 lie along lines that intersect with center C. First path 220 is not along a line that intersects with center C. Paths 218, 220 or beams 212, 214 are parallel and preserve an offset d during propagation. Paths 218, 222 or beams 212, 216 preserve an angle ε to each other during propagation. All paths 218, 220, 222 or beams 212, 214, 216 are contained in common plane Σ.

Apparatus 200 has a rotation mechanism 224 for rotating paths 218, 220, 222 about center C. Mechanism 224 uses any suitable elements such as mirrors, refractive elements, diffractive elements or holographic elements to perform the rotation. In addition, sources 206, 210 are rotated and source 208 is shifted as indicated by the arrows to preserve offset d and angle ε. In this embodiment the rotation and shift of the sources is performed in concert with the action of mechanism 224. The mechanics for performing the rotation and shift of the sources are a part of mechanism 224.

During the rotation, reference beam 212 moves over feature 202 at reference time $t_r$ and first beam 214 moves over feature 202 at a first time $t_1$. Second beam 216 moves over feature 202 at a second time $t_2$. A determination unit 226 is provided for determining distance r between center C and feature 202 from times $t_r$, $t_1$, $t_2$. Unit 226 has a detector 228 for detecting scattered beams 212', 214', 216' returning from point $P_o$ along path g.

Beams 212, 214, 216 have mutually distinguishing properties such as different wavelengths, polarizations, temporal beam formats, intensities or modulations to render them mutually distinguishable to determination unit 226. For this reason, sources 206, 208, 210 have mutually distinct generation modes such that beams 212, 214, 216 are endowed with mutually distinguishing properties. The operation of apparatus 200 is analogous to the operation of the embodiment of FIG. 2.

Figure 9:
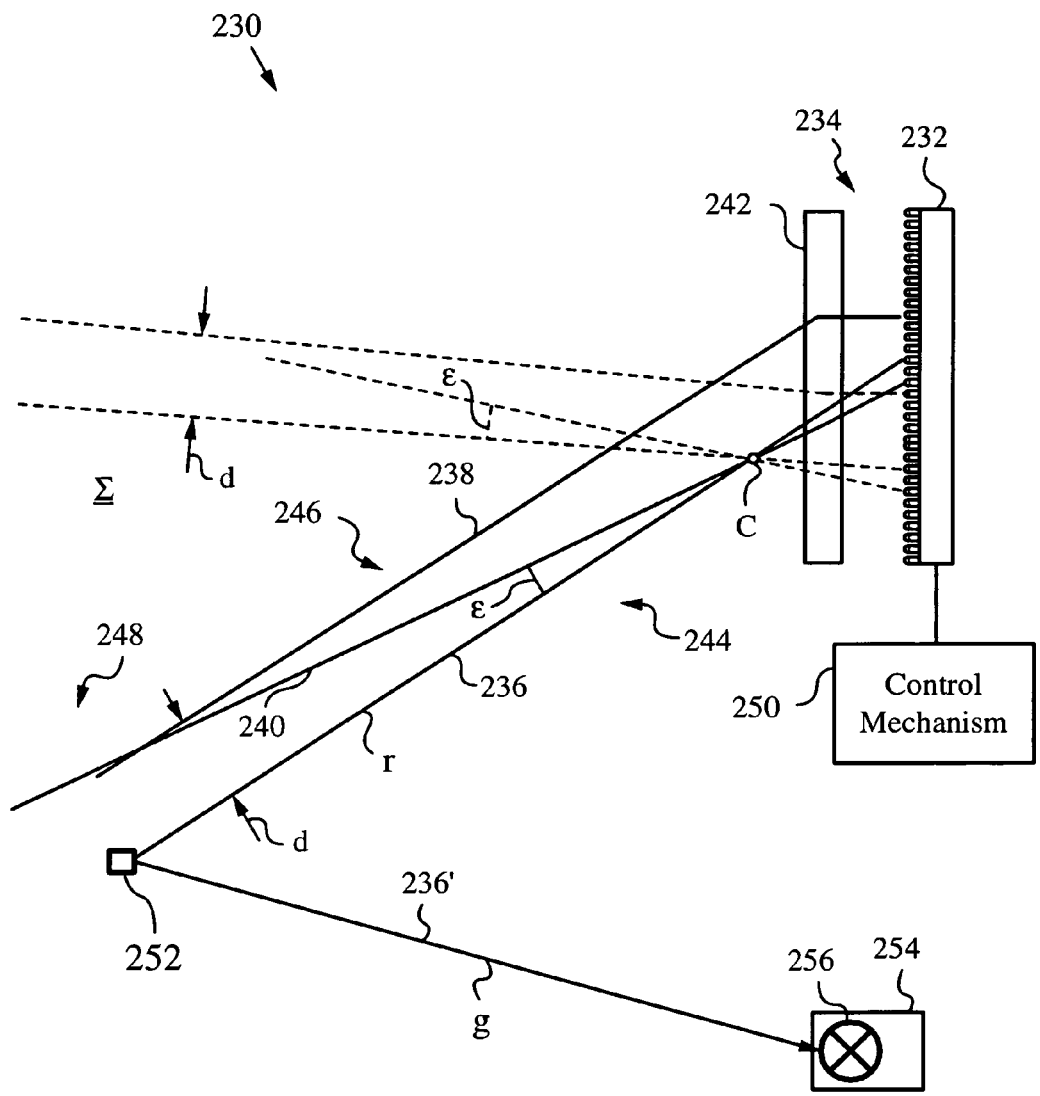
FIG. 9 is a cross-sectional side view of still another alternative apparatus according to the invention in plane Σ.

FIG. 9 illustrates still another apparatus 230 according to the invention in a cross-sectional side view taken in plane Σ. Apparatus 230 uses an active array 232 of sources 234 to generate reference, first and second beams 236, 238, 240. A rotation mechanism in the form of optic 242 rotates optical paths 244, 246, 248 on which beams 236, 238, 240 are launched about a center C. In this embodiment, sources 234 are not moved, rather the appropriate sources 234 of array 232 are turned on and off by a control mechanism 250. Optic 242 can employ any suitable elements such as mirrors, refractive elements, diffractive elements or holographic elements to perform the effective rotation about center C.

Apparatus 230 is used for measuring a distance r between center C and a feature 252. During operation, mechanism 250 switches sources 234 is succession such that beams 236, 238, 240 scatter from feature 252 at reference, first and second times $t_r$, $t_1$, $t_2$. A determination unit 254 is provided for determining distance r from times $t_r$, $t_1$, $t_2$. Unit 254 has a detector 256 for detecting scattered beams 236', 238', 240' returning from feature 252 along path g. Unit 254 determines distance r with the aid of equation 7.

The advantage of apparatus 230 is that it requires no moving parts. Beams 236, 238, 240 have mutually distinguishing properties such as different wavelengths, polarizations, temporal beam formats, intensities or modulations to render them mutually distinguishable to determination unit 254.

Figure 10:
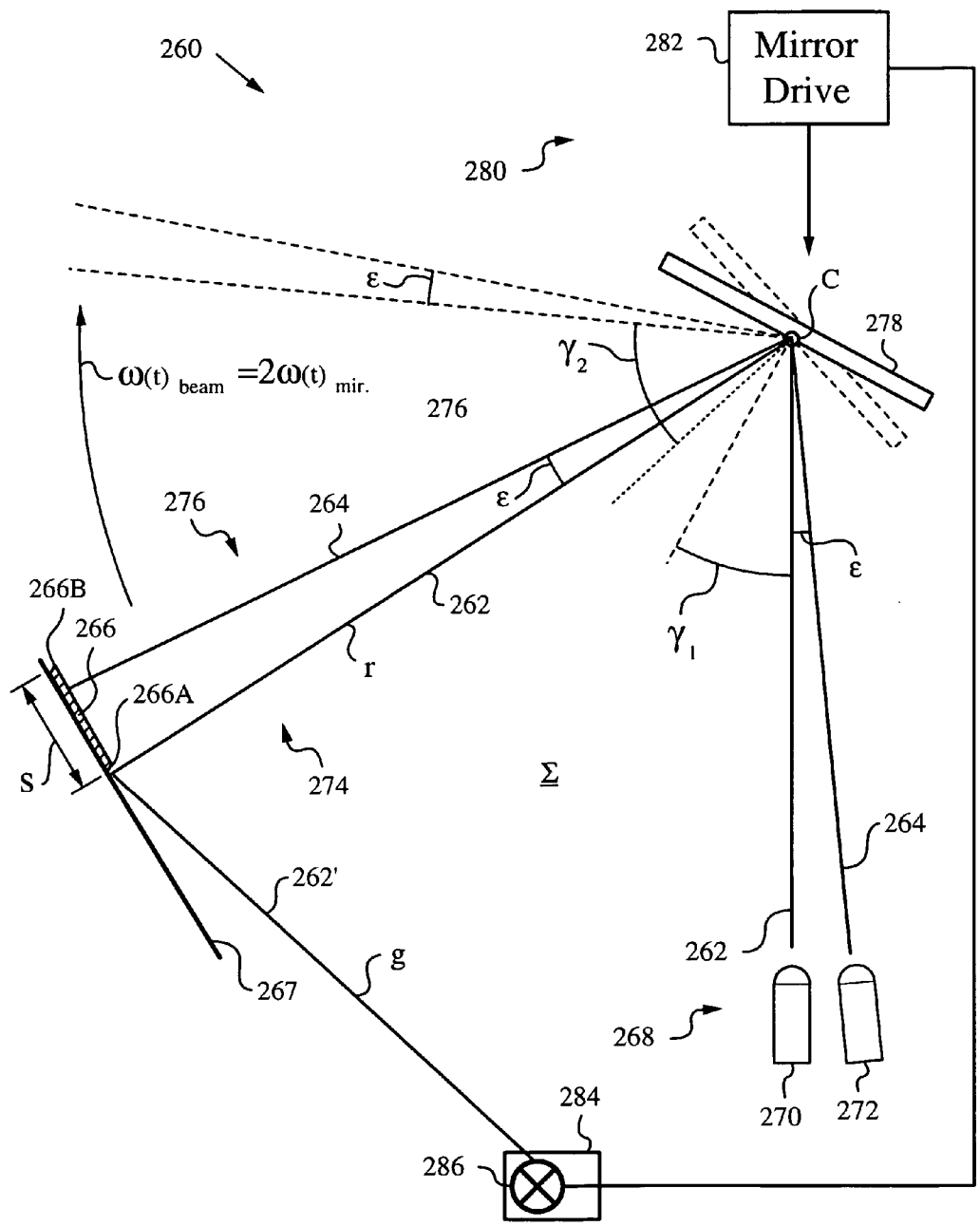
FIG. 10 is a cross-sectional side view in plane Σ of a portion of another apparatus according to the invention.

FIG. 10 shows a cross-sectional side view in plane Σ of a portion of an apparatus 260 that employs a reference beam 262 and a first beam 264 for measuring distance r from a center C of a mirror 278 to an absorbing feature 266 on a reflective surface 267. A beam generation unit 268 has two sources 270, 272 for launching reference and second beams 262, 264 on reference and second paths 274, 276 to feature 266. Paths 274, 276 are both contained in plane Σ and preserve an angle ε to each other. Thus, angle ε is preserved between beams 262 and 264 while they propagate along paths 274, 276. In addition, reference path 274 and second path 276 are both along lines that intersect with center C. No first beam is used in this embodiment.

Apparatus 260 has a mechanism 280 for rotating reference and second optical paths 274, 276 about center C at a known rate. In the present embodiment mechanism 280 includes mirror 278 and a mirror drive 282. Mirror 278 is mounted such that beams 262, 264 propagating in common plane Σ reflect from center C that lies on an axis of rotation of mirror 278.

Mirror drive 282 changes a mirror rotation angle γ of mirror 278 at a known rate. In the present embodiment, mirror drive 282 changes rotation angle γ periodically at a certain angular frequency $\omega(t)_{mir}$. It is important that rotation angle γ change over a sufficiently large range such that reference beam 262 and second beam 264 move over entire feature 266. Note that the optical angles by which beams 262, 264 are reflected from mirror 278 are twice γ, i.e., 2γ and beam angular frequency $\omega(t)_{beam} = 2\omega(t)_{mir}$.

Apparatus 260 has a determination unit 284 for determining distance r from center C of mirror 278 to feature 266 from two references times $t_{r1}$, $t_{r2}$ or from two second times $t_{21}$, $t_{22}$ and the known rate of change of mirror rotation angle γ. Determination unit 284 has a detector 286 for determining times $t_{r1}$, $t_{r2}$, $t_{21}$, $t_{22}$ from scattered beams 262', 264' detected by detector 286. Since surface 267 is reflective and feature 266 is absorbing, scattered beams 262', 264' are detected by detector 286 while beams 262, 264 are moving over surface 267 but not when moving over feature 266. Thus, during an upswing time $t_{r1}$ corresponds to beam 262 moving from surface 267 onto feature 266, i.e., crossing over edge 266A. Time $t_{r2}$ corresponds to beam 262 moving from feature 266 back onto surface 267, i.e., crossing over edge 266B. Similarly, times $t_{21}$, $t_{22}$ correspond to beam 264 crossing edges 266A and 266B.

A distinguishing property between beams 262 and 264 is used to differentiate between scattered beams 262' and 264'. Unit 284 is also connected to mirror drive 282 to obtain the rate of change of mirror rotation angle γ(t), i.e., angular velocity $\omega(t)_{mir}$ of mirror 278, which it multiplies times two to obtain angular frequency $\omega_{beam}$ of beams 262, 264.

During operation unit 284 applies the following equation to derive distance r using reference beam 262:

$$r = \frac{v_{beam}}{\omega_{beam}} = \frac{s_\perp}{\omega_{beam}\delta t}, \quad (\text{Eq. 9})$$

where $s_\perp$ is the component of length of feature 266 normal to beam 262, i.e., $s_\perp = s \cos\theta$, where θ is the angle of incidence of beam 262 to feature 266 at its center. Meanwhile, δt is the time interval during which no signal is detected by detector 286. This time corresponds to the interval between reference times $t_{r1}$ and $t_{r2}$ when scattered beam 262' is detected by detector 286. Note that equation 9 can be used to determine distance r using times $t_{11}$ and $t_{12}$ of beam 264. In other words, only one of beams 262, 264 is required to determine distance r when $s_\perp$ and $\omega(t)_{beam}$ are known. When $s_\perp$ is not known, unit 284 can calculate it using both beams 262, 264 since angle ε and beam angular velocity $\omega(t)_{beam}$ are known. More specifically, a perpendicular distance covered by beam 262 between times $t_{r1}$ and $t_{11}$ or between times $t_{r2}$ and $t_{12}$ is:

$$d_\perp = r\epsilon. \quad (\text{Eq. 10})$$

and thus transverse velocity $v_{beam}$ is:

$$v_{beam} = \frac{d_\perp}{|t_{r1} - t_{11}|} \text{ or,} \quad (\text{Eq. 11A})$$

$$v_{beam} = \frac{d_\perp}{|t_{r2} - t_{12}|}. \quad (\text{Eq. 11B})$$

Equation 11A computes transverse velocity $v_{beam}$ by triggering off edge 266A and equation 11B computes transverse velocity $v_{beam}$ by triggering off edge 266B (during an up swing of mirror 278). When angular velocity $\omega(t)_{beam}$ is constant either edge can be used for triggering. When angular velocity $\omega(t)_{beam}$ is not constant then transverse velocity $v_{beam}$ can be averaged from equations 11A and 11B.

Once transverse velocity $v_{beam}$ is known, $s_\perp$ is calculated from:

$$s_\perp = v_{beam}|t_{r1} - t_{r2}| \text{ or,} \quad (\text{Eq. 12A})$$

$$s_\perp = v_{beam}|t_{11} - t_{12}|. \quad (\text{Eq. 12B})$$

Note that equation 12A uses beam 262 to calculate $s_\perp$ while equation 12B uses beam 264.

As feature 266 moves and as its component normal to beam 262 changes i.e., as r and $s_\perp$ change, δt changes as well. Beams 262, 264 can be used to measure both as r and $s_\perp$. Note that the ability to measure $s_\perp$ can be used for measuring distances between features as well. The addition of another beam propagating along a beam path non-collinear with center C allows apparatus 260 to operate without having to interrogate mirror drive 282 for angular velocity $\omega(t)_{mir}$ of mirror 278 based on the principles explained above.

Figure 11:
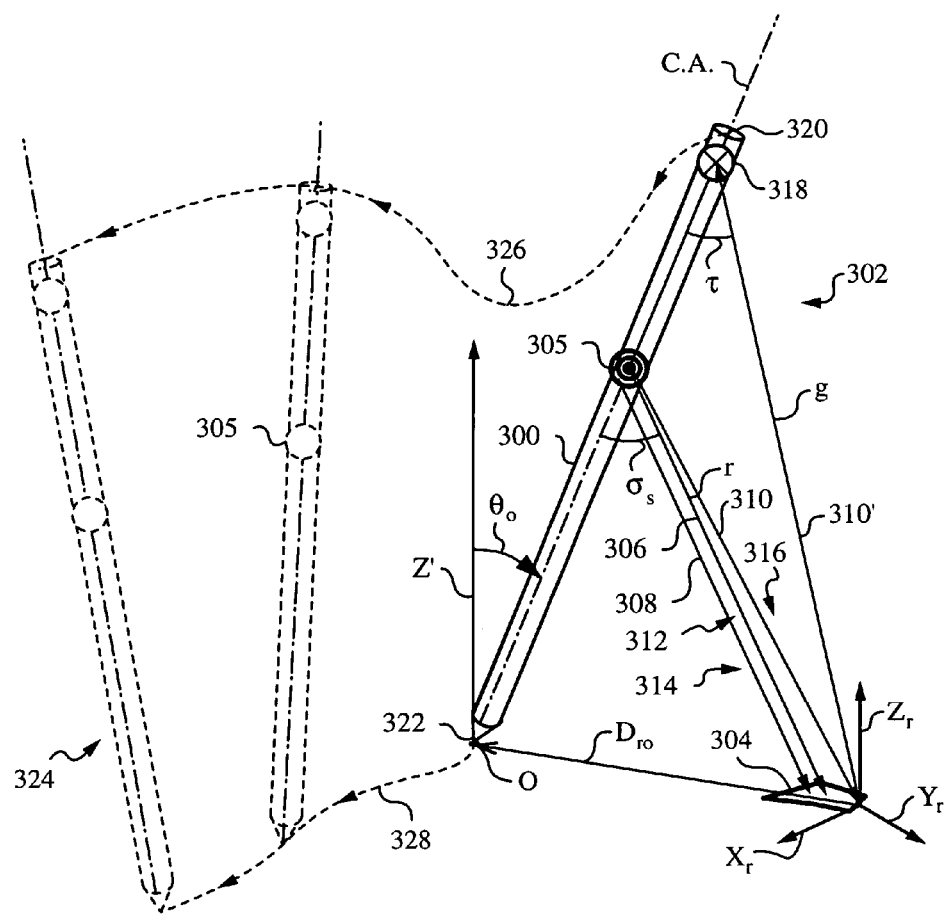
FIG. 11 is a three-dimensional diagram illustrating an elongate object employing an apparatus according to the invention.

FIG. 11 illustrates an elongate object 300 employing an apparatus 302 according to the invention to determine a distance r to a feature 304. Apparatus 302 uses a beam generation unit 305 mounted at a known height to launch a reference, first and second beams 306, 308, 310 on reference, first and second paths 312, 314, 316. Paths 312, 316 are along lines that intersect with a center C (not shown) while path 314 is not. Also, paths 312, 314 preserve an offset d and paths 312, 316 preserve an angle ε. Moreover, all paths 312, 314, 316 are in a common plane Σ.

A rotation mechanism (not shown) uses a MEMs scanning mirror to rotate paths 312, 314, 316 about center C in the manner explained above. At the instant shown, the scanning mirror is sending reference beam 306 along reference path 312 at a scan angle $\sigma_s$ to its center axis C.A.

A determination unit 318 is mounted near a top end 320 of elongate object 300. Determination unit 318 has a detector (not shown) for detecting scattered beams 306', 308', 310'. Determination unit 318 determines distance r from times $t_r$, $t_1$, $t_2$ when beams 306, 308, 310 scatter from feature 304 or portions thereof. At the instant shown, beam 310 is scattering from an edge of feature 304 and sending a scattered beam 310' along path g to determination unit 318. Scattered beam 310' arrives at an angle $\tau$ to center axis C.A.

Elongate object 300 has a tip 322 at an origin O of object coordinates (X',Y',Z'). Object 300 is inclined with respect to axis Z' by an inclination angle $\theta_o$. Feature 304 is described in coordinates ($X_r$,$Y_r$,$Z_r$). Knowledge of the location of center C in coordinates (X',Y',Z') and angle $\sigma$ at times when feature 304 of known geometry is detected permits one to determine the position of feature 304 in coordinates (X',Y',Z'). In other words, coordinates ($X_r$,$Y_r$,$Z_r$) can be indexed by an offset vector $D_{ro}$ to object coordinates (X',Y',Z'). For precise indexing it is preferable to determine distance r based on a statistically significant number of scattering points on feature 304.

In some cases feature 304 can be detected while elongate object 300 executes a motion 324 corresponding to a movement 326 of top end 320 and a movement 328 of tip 322. Under these conditions a pose of object 300 can be tracked with respect to feature 304. Note that to accomplish this, plane $\Sigma$ may need to be rotated about center axis C.A. to ensure that beams 306, 308, 310 move over feature 304 as object 300 is executing motion 324.

Figure 12:
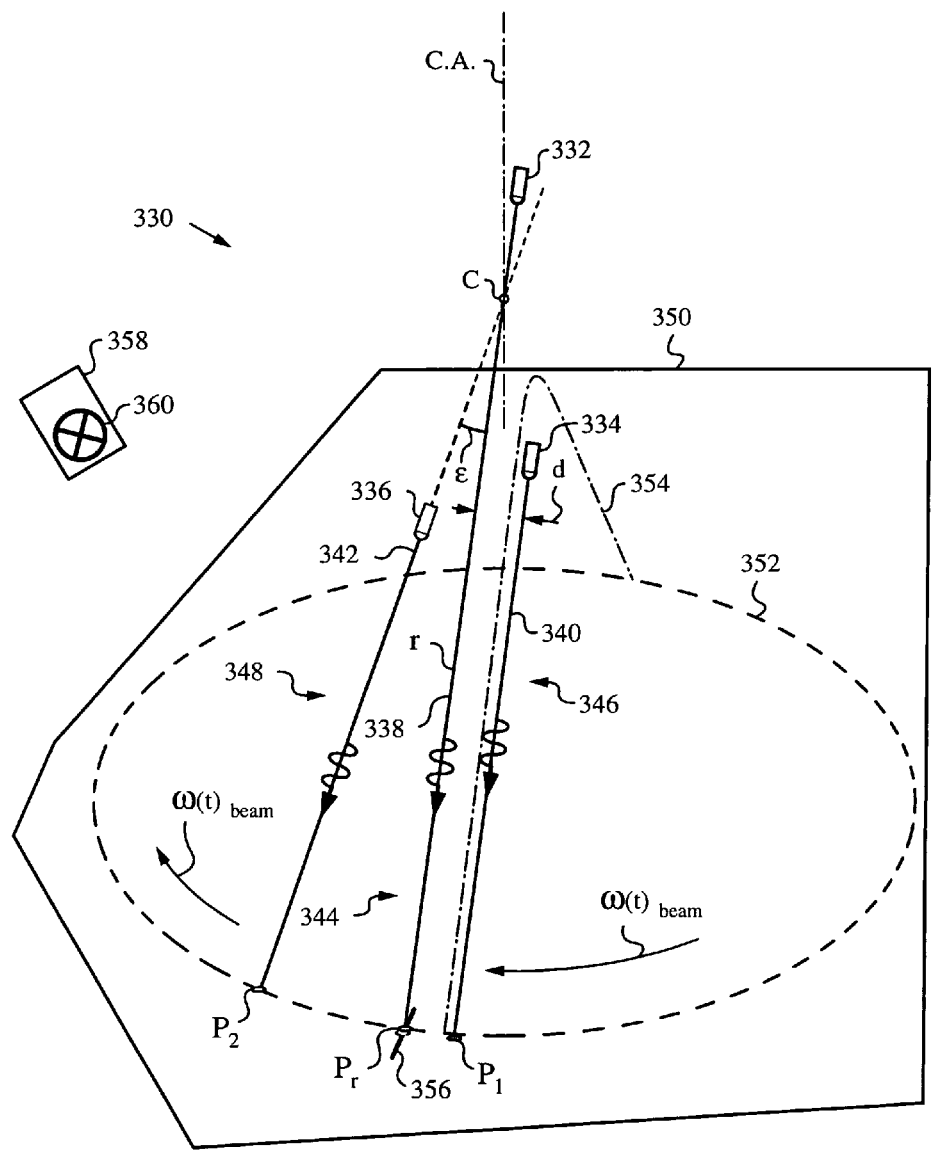
FIG. 12 is a three-dimensional diagram of yet another alternative apparatus according to the invention.

FIG. 12 is a three-dimensional diagram of yet another apparatus 330 according to the invention. Apparatus 330 has reference, first and second sources 332, 334, 336 for launching reference, first and second beams 338, 340, 342 on reference, first and second paths 344, 346, 348. Reference path 344 is along a line that intersects with a center C, as is second path 348. First path 346 is not along a line that intersects with center C. Paths 344 and 348 preserve an angle $\epsilon$ between each other. Paths 344 and 346 are nearly parallel, as explained below. Center C defines the apex of a conical surface. An intersection of the conical surface with a plane surface 350 is indicated in a dashed ellipse 352.

A rotation mechanism (not shown) rotates paths 344, 346, 348 about center C while preserving their geometric relationship. More precisely, paths 344, 346, 348 are rotated about a center axis C.A. of the conical surface passing through the apex or center C. As a result, paths 344, 348 are confined to move on the conical surface and thus trace out a scan path on surface 350 coincident with ellipse 352. Path 346 is offset from path 344 and almost parallel with it. As clarified by a section 354 of the conical surface path 346 cannot be both confined to the conical surface and parallel to path 344. Therefore, an offset distance d between paths 344 and 346 is only nearly constant. However, since section 354 is a hyperbola that rapidly approaches its linear asymptote, choosing 346 to lie on the asymptote ensures that paths 344 and 346 are nearly parallel at surface 350 and distance d is nearly constant. Because of these geometrical reasons, a scan point $P_1$ produced on surface 350 by first beam 340 will generally be offset from elliptical scan path 352 followed by scan points $P_r$, $P_2$ produced on surface 350 by beams 338 and 342.

During operation the mechanism rotates paths 344, 346, 348 at an angular velocity $\omega(t)_{beam}$ about center axis C.A. Thus, beams 338, 340, 342 move over a feature 356 on surface 350 and scatter from it at times $t_r$, $t_1$, and $t_2$. A determination unit 358 uses a detector 360 to detect scattered radiation produced by beams 338, 340, 342 moving over feature 356. From times $t_r$, $t_1$, and $t_2$ unit 358 determines a distance r from center C to feature 356. Note that beams 338, 340, 342 are endowed with mutually distinguishing properties so that detector 360 can differentiate them. Also note that this embodiment can employ just beams 338 and 340 when angular velocity $\omega(t)_{beam}$ is known (e.g., from a separate measurement unit or from the rotation mechanism).

Apparatus 330 is useful when a number of features lie on elliptical scan path 352 and their distances $r_i$ to center C need to be known. Since beams 338, 340 are only nearly parallel, the features should be sufficiently large that both scan points $P_r$, $P_1$ move over them at all inclinations of surface 350 that are of practical interest.

Figure 13:
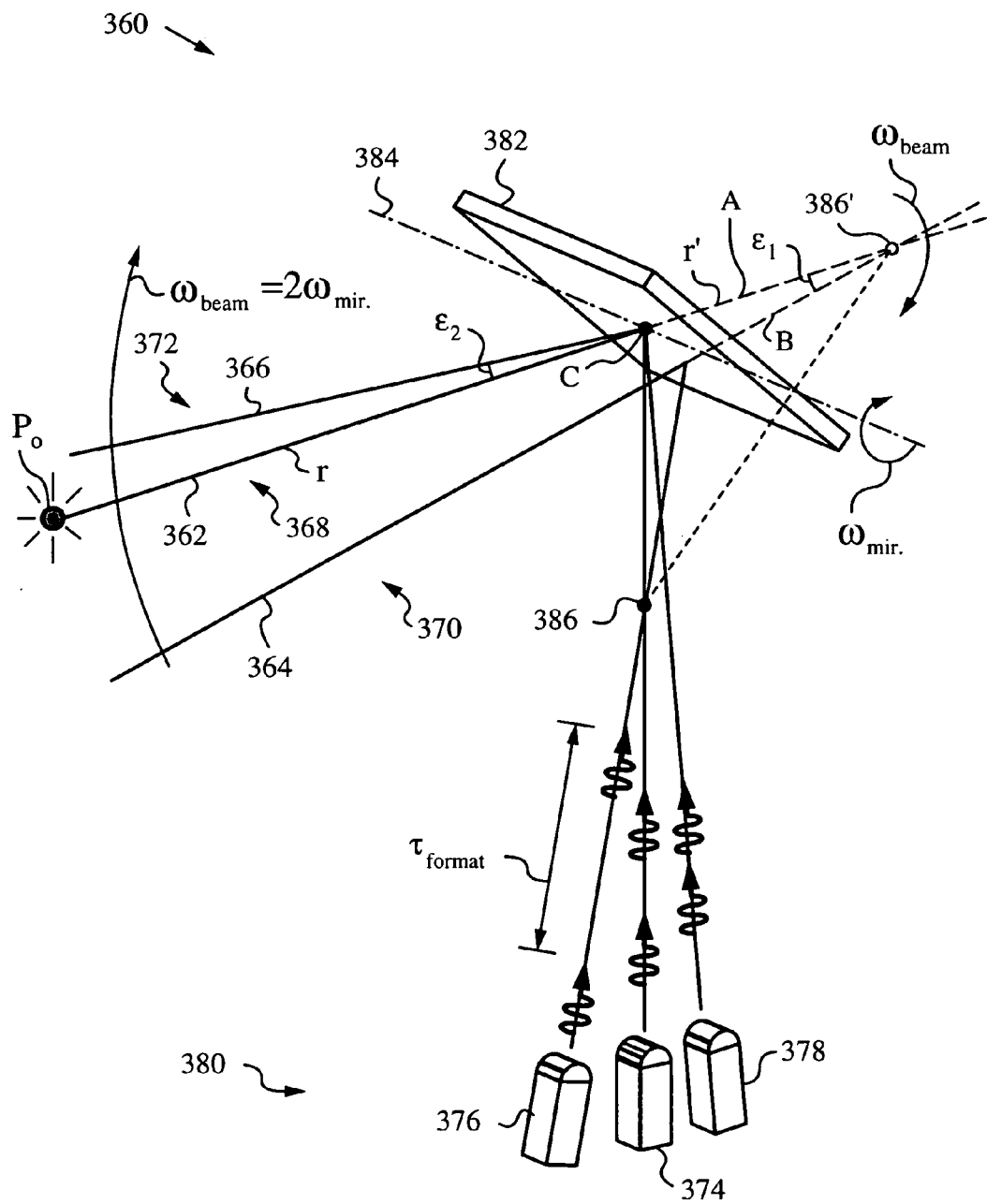
FIG. 13 is a three-dimensional view of a portion of an apparatus using non-parallel beam paths.

FIG. 13 is a three-dimensional view of a portion of an apparatus 360 using reference, first and second beams 362, 364, 366 launched on three non-parallel paths 368, 370, 372 from sources 374, 376, 378 belonging to a beam generation unit 380. Reference path 368 is along a line A that intersects with a center C chosen in the center of a mirror 382 and on its axis of rotation 384. First path 370 is along a line B that does not intersect with center C and intersects reference path 368 in its non-collinear folded path portion at an intersection point 386. Reference path 368 and first path 370 preserve an angle $\epsilon_1$ between each other. Second path 372 intersects reference path 368 at center C and these two paths preserve an angle $\epsilon_2$ between each other. All three paths 368, 370, 372 are in a common plane $\Sigma$ (not shown) and have folded portions extending from sources 374, 376, 378 to the surface of mirror 382.

Lines A and B collinear with paths 368, 370 are indicated in dashed lines. Lines A, B intersect at an intersection point 386' that is a virtual image of point 386. A distance r' between center C and point 386' is indicated along line A.

Apparatus 360 uses distinct temporal beam formats as the mutually distinguishing properties between beams 362, 364, 366. Specifically, a time of emission between pulses of radiation or format time $\tau_{format}$ is different for each beam. First beam 364 uses a long format time, reference beam 362 uses an intermediate format time and second beam 366 uses a short format time. In this embodiment, the pulses all have the same duration, but in alternative embodiments their duration can be varied.

To measure a distance r from center C to a feature, in the present case a scattering point $P_o$, mirror 382 is rotated by a rotation mechanism about axis 384 to thus rotate paths 368, 370, 372 about center C. This is performed such that beams 362, 364, 366 all move over point $P_o$. Mirror 382 rotates about axis 384 at an angular velocity $\omega_{mir}$. Beams 362, 364, 366 as well as point 386' rotate about axis 384 at angular velocity $\omega_{beam} = 2\omega_{mir}$.

Beams 362, 364, 366 scatter from point $P_o$ at times $t_r$, $t_1$, $t_2$ and a determination unit (not shown) determines distance r from these times. In this embodiment, the determination unit uses the following equation:

$$r = \frac{\varepsilon_1 r'}{\left(\frac{|t_r - t_1|}{|t_r - t_2|}\varepsilon_2 - \varepsilon_1\right)}.$$ (Eq. 13)

Figure 14:
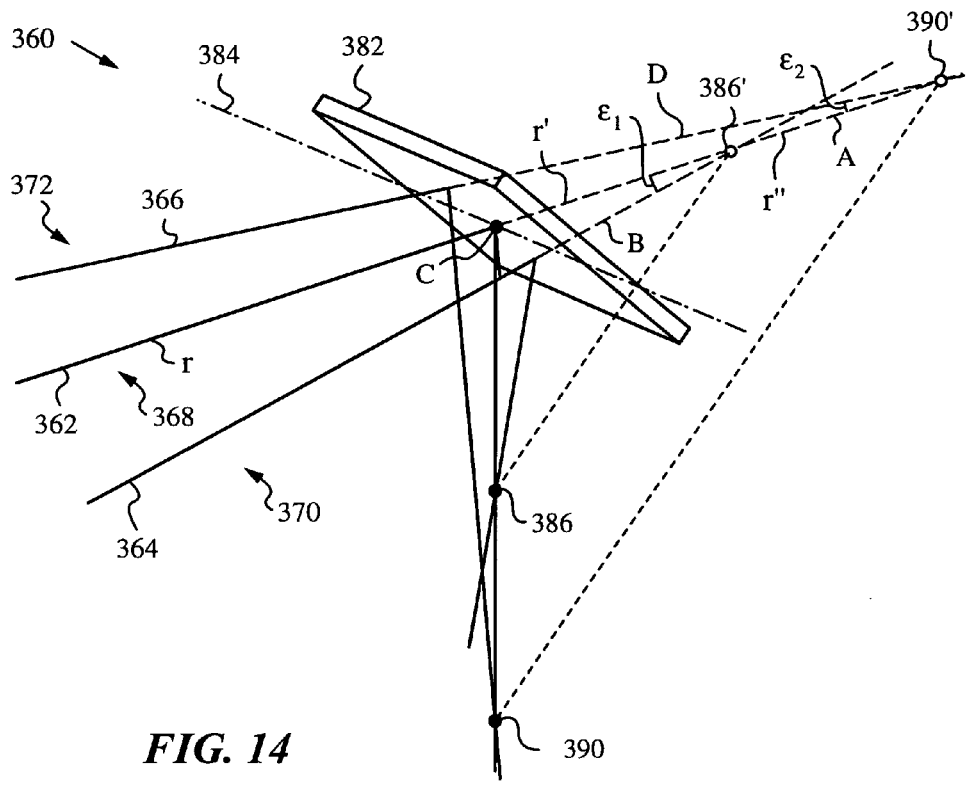
FIG. 14 is a three-dimensional view of a portion of the apparatus of FIG. 13 using a different arrangement of non-parallel beam paths.

FIG. 14 illustrates a different arrangement of reference, first and second paths 368, 370, 372 in apparatus 360. In this arrangement, second path 372 intersects reference path 362 in the non-collinear folded path portion at a point 390. Line D collinear with path 372 is indicated in dashes. Line D intersects line A at an intersection point 390' that is a virtual image of point 390. A distance r' between center C and point 386' is indicated along line A and a distance r" between center C and point 390' is also indicated along line A. In this embodiment, the determination unit uses the following equation to determine distance r:

$$r = \frac{\left(\frac{r'\varepsilon_1}{|t_r - t_1|} - \frac{r''\varepsilon_2}{|t_r - t_2|}\right)}{\left(\frac{\varepsilon_2}{|t_r - t_2|} - \frac{\varepsilon_1}{|t_r - t_1|}\right)}.$$ (Eq. 14)

Note that angles $\varepsilon_1$ and $\varepsilon_2$ can be equal in the embodiments of FIGS. 13 and 14. Also note that equation 13 can be derived from equation 14 for the special case when r"=0.

In yet another embodiment reference path 368 as shown in FIG. 14 can be eliminated to leave only first path 370 and second path 372. In this case one of these two paths can be used as the reference path. Note that of these two remaining paths neither is along a line that intersects with center C. A person skilled in the art will recognize that equation 14 can be used to determine r in this embodiment.

Figure 15:
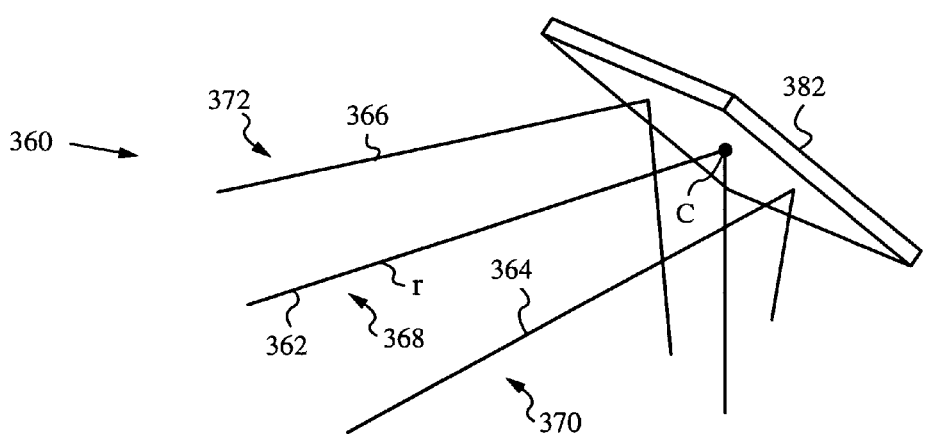
FIG. 15 is a three dimensional view of an apparatus employing three non-coplanar beam paths.

FIG. 15 illustrates yet another alternative of apparatus 360 in which paths 368, 370, 372 are not contained in common plane Σ. In fact, each path 368, 370, 372 is in its own plane. The three planes are parallel. This alternative can be used when the feature to which distance r is measured is a macro-structure of sufficient width to permit all beams 362, 364, 366 to move over it.

It should be noted that the apparatus and method of invention can be practiced without providing active illumination or beams. For example, referring back to FIG. 6, ambient radiation on paths 160, 162, 164 propagating to detectors 174, 176, 178 rather than back-scattered radiation 152', 154', 156' returning along those paths can be used by determination unit 166 for determining distance r. Note that in this case ambient radiation needs to be present and its intensity level needs to be sufficiently high to permit reliable detection by detectors 174, 176, 178.

The apparatus and method of invention are well-suited for determining intermediate distances ranging from a few centimeters to a few meters. The apparatus and method are convenient in applications where time-of-flight is not appropriate due to resolution or other limitations. However, the apparatus and method are not limited to measuring intermediate distances. In fact, the invention provides a simple, easy-to-use and low-cost system for determining distances to stationary or moving objects with as few as two optical beams.

It should be noted that when the locations and separations of features or scattering points are known then the method of invention can be used for calibration. In particular, the method can be employed to calibrate angular velocities ω(t) or rotation angles γ(t) of mirrors or other elements such as refractive elements, diffractive elements and holographic elements employed in the rotation mechanisms. A person skilled in the art will recognize that the above embodiments are merely exemplary and that various other embodiments are possible. Therefore, the scope of the invention should be determined by the appended claims and their legal equivalents.

We claim:

1. An apparatus for optical determination of distance to a feature, said apparatus comprising:
    a) a beam generation unit for launching a reference beam on a reference path and a first beam on a first path;
    b) a rotation mechanism for rotating said reference path and said first path about a center along a line of said reference path and not along a line of said first path, wherein said line of said reference path and said line of said first path are non-parrallel, and wherein said reference beam moves over said feature at a reference time $t_r$ and said first beam moves over said feature and at a first time $t_1$;
    c) a determination unit for determining a distance r from said center to said feature from an angular velocity ω of said reference beam over said feature and from said times $t_r$, $t_1$.

2. The apparatus of claim 1, wherein at least one of said reference path and said first path further comprise a non-collinear folded path portion.

3. The apparatus of claim 1, wherein said rotation mechanism comprises at least one element selected from the group consisting of mirrors, refractive elements, diffractive elements and holographic elements.

4. The apparatus of claim 1, wherein said reference path and said first path are in a common plane Σ.

5. The apparatus of claim 1, wherein said determination unit comprises a detector for detecting said reference beam and said first beam.

6. The apparatus of claim 1, wherein said beam generation unit comprises a reference source for launching said reference beam and a first source for launching said first beam.

7. The apparatus of claim 6, wherein said beam generation unit comprises an active array of sources.

8. The apparatus of claim 6, wherein said reference source and said first source have distinct generation modes for endowing said reference beam and said first beam with mutually distinguishing properties.

9. The apparatus of claim 8, wherein said distinguishing properties are selected from the group consisting of polarization, wavelength, temporal beam format and intensity.

10. The apparatus of claim 9, wherein said distinguishing properties comprise wavelength and said determination unit comprises at least one wavelength filter.

11. The apparatus of claim 9, wherein said determination unit comprises a reference detector for detecting said reference beam and a first detector for detecting said first beam.

12. The apparatus of claim 1, wherein said beam generation unit launches a second beam on a second path chosen such that said center is along a line of said second path, said rotation mechanism rotates said second path such that said second beam moves over said feature at a second time $t_2$, and said determination unit determines said angular velocity ω of said reference beam from said times $t_r$, $t_2$.

13. The apparatus of claim 12, wherein said beam generation unit comprises a second source for launching said second beam, and wherein said second source has a distinct generation mode for endowing said second beam with a distinguishing property selected from the group consisting of polarization, wavelength, temporal beam format and intensity.

14. The apparatus of claim 12, wherein said reference path, said first path and said second path are in a common plane Σ.

15. The apparatus of claim 1, further comprising an angular velocity unit for measuring said angular velocity ω of said reference beam, said angular velocity unit being in communication with said determination unit.

16. The apparatus of claim 1, wherein said feature is selected from the group consisting of micro-structure and macro-structure.

17. An apparatus for optical determination of distance to a feature, said apparatus comprising:
   a) a beam generation unit for launching a reference beam on a reference path, a first beam on a first path and a second beam on a second path;
   b) a rotation mechanism for rotating said reference path, said first path and said second path about a center along a line of said reference path and not along a line of said first path, whereby said reference beam moves over said feature at a reference time $t_r$, said first beam moves over said feature and at a first time $t_1$ and said second beam moves over said feature at a time $t_2$;
   c) a determination unit for determining a distance r from said center to said feature from an angular velocity ω of said reference beam over said feature from said times $t_r$, $t_1$, and determining said angular velocity ω of said reference beam from said times $t_r$, $t_2$.

18. An apparatus for optical determination of distance to a feature, said apparatus comprising:
   a) a radiation detection unit for detecting radiation on a reference path and on a first path;
   b) a rotation mechanism for rotating said reference path and said first path about a center along a line of said reference path and not along a line of said first path, wherein said line of said reference path and said line of said first path are non-parrallel, and whereby radiation from said feature is detected on said reference path at a at a reference time $t_r$ and on said first path at a first time $t_1$;
   c) a determination unit for determining a distance r from said center to said feature from an angular velocity ω of said reference path over said feature and from said times $t_r$, $t_1$.

19. A method for optical determination of distance to a feature, said method comprising:
   a) launching a reference beam on a reference path and a first beam on a first path;
   b) rotating said reference path and said first path about a center along a line of said reference path and not along a line of said first path, wherein said line of said reference path and said line of said first path are non-parrallel, and whereby said reference beam moves over said feature at a reference time $t_r$ and said first beam moves over said feature at a first time $t_1$;
   c) determining a distance r from said center to said feature from an angular velocity ω of said reference beam over said feature and from said times $t_r$, $t_1$.

20. The method of claim 19, further comprising adding a non-collinear folded path portion to at least one of said reference path and said first path.

21. The method of claim 19, wherein said step of rotating is performed with at least one element selected from the group consisting of mirrors, refractive elements, diffractive elements and holographic elements.

22. The method of claim 19, wherein said reference path and said first path are arranged in a common plane Σ.

23. The method of claim 19, further comprising endowing said reference beam and said first beam with mutually distinguishing properties.

24. The method of claim 23, wherein said distinguishing properties are selected from the group consisting of polarization, wavelength, temporal beam format and intensity.

25. The method of claim 19, further comprising:
   a) launching a second beam on a second path chosen such that said center is along a line of said second path;
   b) rotating said second path together with said reference path and said first path about said center such that said second beam moves over said feature at a second time $t_2$; and
   c) determining said angular velocity ω of said reference beam from said times $t_r$, $t_2$.

26. The method of claim 25, further comprising endowing said second beam with a distinguishing property.

27. The method of claim 26, wherein said distinguishing property is selected from the group consisting of polarization, wavelength, temporal beam format and intensity.

28. The method of claim 25, wherein said reference path, said first path and said second path are in a common plane Σ.

29. The method of claim 19, further comprising measuring said angular velocity ω with an angular velocity unit.

30. The method of claim 19, wherein said feature is selected from the group consisting of micro-structure and macro-structure.

31. A method for optical determination of distance to a feature, said method comprising:
   a) launching a reference beam on a reference path, a first beam on a first path and a second beam on a second path;
   b) rotating said reference path, said first path and said second path about a center along a line of said reference path and not along a line of said first path, whereby said reference beam moves over said feature at a reference time $t_r$, said first beam moves over said feature at a first time $t_1$ and said second beam moves over said feature at a time $t_2$;
   c) determining a distance r from said center to said feature from an angular velocity ω of said reference beam over said feature and from said times $t_r$, $t_1$,
   d) determining said angular velocity ω of said reference beam from said times $t_r$, $t_2$.

32. A method for optical determination of distance to a feature, said method comprising:
   a) providing a reference path and a first path for a radiation;
   b) rotating said reference path and said first path about a center along a line of said reference path and not along a line of said first path, wherein said line of said reference path and said line of said first path are non-parallel, and whereby radiation from said feature is detected on said reference path at a reference time $t_r$ and on said first path at a first time $t_1$;
   d) determining a distance r from said center to said feature from an angular velocity ω of said reference path over said feature and from said times $t_r$, $t_1$.

* * * * *